(12) United States Patent
Nakayama et al.

(10) Patent No.: US 12,173,101 B2
(45) Date of Patent: Dec. 24, 2024

(54) CURABLE COMPOSITION, CURED SUBSTANCE, OPTICAL MEMBER, AND LENS

(71) Applicant: FUJIFILM Corporation, Tokyo (JP)

(72) Inventors: Takafumi Nakayama, Ashigarakami-gun (JP); Naoyuki Morooka, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 529 days.

(21) Appl. No.: 17/672,134

(22) Filed: Feb. 15, 2022

(65) Prior Publication Data

US 2022/0169766 A1 Jun. 2, 2022

Related U.S. Application Data

(63) Continuation of application No. PCT/JP2020/031362, filed on Aug. 20, 2020.

(30) Foreign Application Priority Data

Aug. 22, 2019 (JP) .................. 2019-152011

(51) Int. Cl.
*C08F 220/30* (2006.01)
*G02B 1/04* (2006.01)

(52) U.S. Cl.
CPC .......... *C08F 220/301* (2020.02); *G02B 1/041* (2013.01)

(58) Field of Classification Search
CPC . C08F 220/301; C08F 222/1025; G02B 1/041
USPC ....................................................... 526/284
See application file for complete search history.

(56) References Cited

U.S. PATENT DOCUMENTS

| | | | |
|---|---|---|---|
| 2015/0197592 A1 | 7/2015 | Someya et al. |
| 2017/0237005 A1 | 8/2017 | Weitz et al. |
| 2017/0342181 A1 | 11/2017 | Morooka |
| 2019/0233563 A1 | 8/2019 | Morooka |

FOREIGN PATENT DOCUMENTS

| | | |
|---|---|---|
| CN | 104684946 A | 6/2015 |
| CN | 107004768 A | 8/2017 |
| JP | 2004-137262 A | 5/2004 |
| JP | 2012-041371 A | 3/2012 |
| JP | 2014-080572 A | 5/2014 |
| JP | 5940496 B2 | 6/2016 |

(Continued)

OTHER PUBLICATIONS

Machine-generated English language translation of Description of JP2018-059063A, 42 pages, retrieved from Espacenet on Sep. 19, 2024. (Year: 2018).*

(Continued)

*Primary Examiner* — Fred M Teskin
(74) *Attorney, Agent, or Firm* — Sughrue Mion, PLLC

(57) ABSTRACT

A lens having high quality even after long-term storage can be manufactured using a curable composition containing a compound represented by General Formula A, a compound represented by General Formula B, and a polymerization initiator, in which a ratio of a substance amount of the compound represented by General Formula B to a substance amount of the compound represented by General Formula A is 1 to 25 mol %.

General Formula A

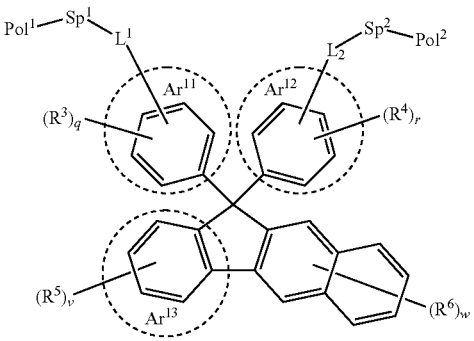

General Formula B

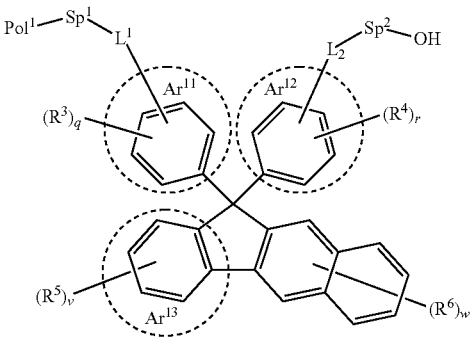

In the Formulas, each portion surrounded by a broken line of $Ar^{11}$, $Ar^{12}$, and $Ar^{13}$ represents that each of the portions may form a fused ring; $L^1$ and $L^2$ each represent a single bond, —O—, or the like; $Sp^1$ and $Sp^2$ each represent a single bond or a divalent linking group; $Pol^1$ and $Pol^2$ each represent a polymerizable group; $R^3$ to $R^6$ each represent a substituent; and q, r, v, and w are each an integer of 0 to 4.

20 Claims, No Drawings

(56) References Cited

FOREIGN PATENT DOCUMENTS

| JP | 2018-059063 A | 4/2018 |
|---|---|---|
| JP | 2019-131571 A | 8/2019 |
| KR | 10-2019-0085425 A | 7/2019 |
| WO | 2016/140245 A1 | 9/2016 |
| WO | 2018/066279 A1 | 4/2018 |
| WO | 2018/168233 A1 | 9/2018 |
| WO | 2019/035461 A1 | 2/2019 |

OTHER PUBLICATIONS

International Preliminary Report on Patentability dated Feb. 17, 2022 with a Translation of the Written Opinion of the International Searching Authority in Application No. PCT/JP2020/031362.
Written Opinion dated Oct. 27, 2020 issued by the International Searching Authority in Application No. PCT/JP2020/031362.
International Search Report issued Oct. 27, 2020 in International Application No. PCT/JP2020/031362.
Office Action dated Dec. 2, 2022 from the Chinese Patent Office in Application No. CN 202080056945.9.
Baochun et al., "Study on the performance of polyimide film with diphenyl fluorenyl group", New Chemical Materials, Sep. 2016, vol. 44, No. 9, pp. 67-69 (3 total pages).
Allen et al., "Photochemistry and Photopolymerization Activity of Perester Derivatives of Benzophenone", Journal of Applied Polymer Science, 1991, vol. 42, pp. 1169-1178 (10 total pages).
Office Action dated Sep. 6, 2022 issued by the Japanese Patent Office in Japanese Application No. 2021-540977.

* cited by examiner

CURABLE COMPOSITION, CURED SUBSTANCE, OPTICAL MEMBER, AND LENS

CROSS-REFERENCE TO RELATED APPLICATIONS

This application is a continuation of PCT International Application No. PCT/JP2020/031362 filed on Aug. 20, 2020, which claims priority under 35 U.S.C § 119 (a) to Japanese Patent Application No. 2019-152011 filed on Aug. 22, 2019, the entire content of which is incorporated herein by reference.

BACKGROUND OF THE INVENTION

1. Field of the Invention

The present invention relates to a curable composition, a cured substance, an optical member, and a lens.

2. Description of the Related Art

In the related art, glass materials have been used for an optical member of an imaging module such as a camera, a video camera, a mobile phone with a camera, a video phone, or a door phone with a camera. Glass materials have been used preferably because they have various optical characteristics and excellent environmental resistance, but they have a disadvantage in that weight reduction and miniaturization are not easy and workability and productivity are poor. In contrast, resin cured substances can be produced in a massive amount and have excellent workability, and therefore they have recently been used in various optical members.

In recent years, a size of an optical member used in an imaging module is required to be reduced in accordance with miniaturization of the imaging module, but in a case of miniaturizing an optical member, a problem of chromatic aberrations occurs. Accordingly, in an optical member formed of a resin cured substance, examinations have been conducted regarding adjusting an Abbe number using a monomer of a curable composition and additives, and thereby correcting chromatic aberrations.

For example, JP2018-59063A and JP5940496B disclose that a cured substance suitable for producing an optical member such as a lens can be obtained from a composition containing a polyfunctional (meth)acrylate monomer having a diphenylfluorene skeleton.

SUMMARY OF THE INVENTION

When the inventors of the present invention attempted to manufacture a lens formed of a curable composition containing a polyfunctional monomer having a diphenylfluorene skeleton and having a fused aryl structure in a fluorene moiety as disclosed in JP2018-59063A, it has been found that the uniformity of a resin is lowered due to the crystallization of the monomer after long-term storage, which is a cause of problems such as poor external appearance in a case where a cured substance is produced.

An object of the present invention is to provide a curable composition which contains a polyfunctional monomer having a diphenylfluorene skeleton and can manufacture a lens having high quality even after long-term storage.

When the inventors of the present invention have diligently studied in order to achieve the above-mentioned object, they have found that, in a resin composition in which a monofunctional monomer, which corresponds to a composition containing a polyfunctional monomer having a diphenylfluorene skeleton is blended in the composition at a constant proportion, the crystallization is inhibited, which makes it possible to produce a high-quality cured substance at a high yield even after long-term storage. Based on these findings, the inventors of the present invention have further studied to complete the above-mentioned object.

That is, the present invention provides the following <1> to <12>.

<1> A curable composition comprising a compound represented by General Formula A, a compound represented by General Formula B, and a polymerization initiator, in which a ratio of a substance amount of the compound represented by General Formula B to a substance amount of the compound represented by General Formula A is 1 to 25 mol %.

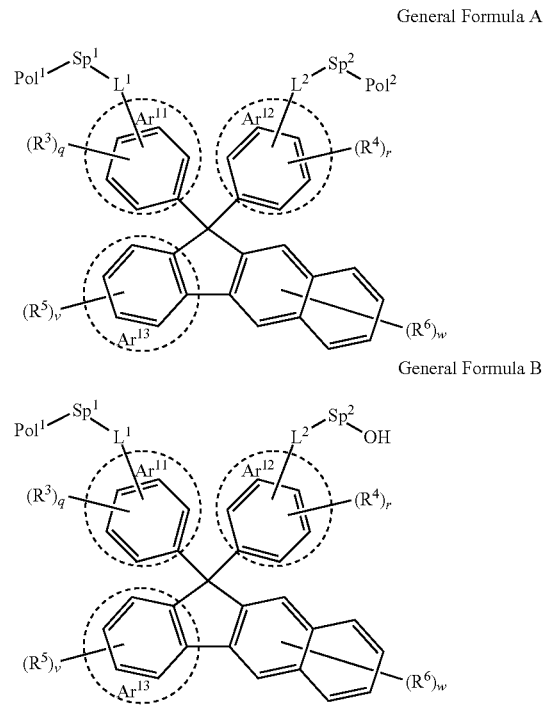

General Formula A

General Formula B

In General Formula A and General Formula B, $Ar^{11}$ and $Ar^{12}$ each independently represent an aryl group containing a benzene ring surrounded by a broken line or a heteroaryl group containing a benzene ring surrounded by a broken line as one of rings constituting a fused ring, $Ar^{13}$ represents an arylene group containing a benzene ring surrounded by a broken line, $L^1$ and $L^2$ each independently represent a single bond, or a linking group selected from the group consisting of —O—, —S—, —C(=O)—, —OC(=O)—, —C(=O)O—, —OC(=O)O—, —SC(=O)—, and —C(=O)S—, $Sp^1$ and $Sp^2$ each independently represent a single bond or a divalent linking group, $Pol^1$ and $Pol^2$ each independently represent a polymerizable group, $R^3$ to $R^6$ each independently represent a substituent, and q, r, v, and w are each independently an integer of 0 to 4.

<2> The curable composition according to <1>, in which $Pol^1$ and $Pol^2$ are each a (meth)acryloyloxy group in General Formula A and General Formula B.

<3> The curable composition according to <1> or <2>, in which a ratio of a substance amount of the compound represented by General Formula B to a substance amount of the compound represented by General Formula A is 2 to 20 mol %.

<4> The curable composition according to any one of <1> to <3>, further comprising a non-conjugated-vinylidene-group-containing compound.

<5> The curable composition according to <4>, in which the non-conjugated-vinylidene-group-containing compound is a compound represented by General Formula (2).

General Formula (2)

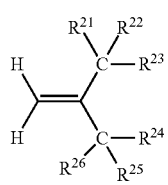

In the formula, $R^{21}$ to $R^{26}$ each independently represent a hydrogen atom or a substituent, and at least two of $R^{21}$ to $R^{26}$ form a ring, where the compound represented by General Formula (2) does not contain a polymerizable group.

<6> The curable composition according to <4> or <5>, in which the non-conjugated-vinylidene-group-containing compound further has a double bond in addition to a non-conjugated vinylidene group.

<7> The curable composition according to any one of <4> to <6>, further comprising a hydroperoxide.

<8> The curable composition according to any one of <1> to <7>, further comprising an acidic phosphoric acid ester.

<9> The curable composition according to <8>, in which the acidic phosphoric acid ester is a compound represented by General Formula X.

General Formula X

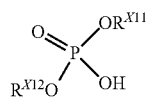

In General Formula X, $R^{X11}$ represents an alkyl group which may have a substituent, and $R^{X12}$ represents a hydrogen atom or an alkyl group which may have a substituent.

<10> A cured substance of the curable composition according to any one of <1> to <9>.

<11> An optical member comprising the cured substance according to <10>.

<12> A lens comprising the cured substance according to <10>.

According to the present invention, a curable composition, which contains a polyfunctional monomer having a diphenylfluorene skeleton and can manufacture a lens having high quality even in the case of use after long-term storage, is provided. A high functional optical member and a high functional lens can be provided by using the curable composition of the present invention.

DESCRIPTION OF THE PREFERRED EMBODIMENTS

Hereinafter, the present invention will be described in detail. The description of constituent requirements described below can be made based on representative embodiments and specific examples, but the present invention is not limited to such embodiments. Numerical value ranges expressed using "to" in the present specification mean a range including numerical values described before and after "to" as a lower limit value and an upper limit value.

In the present specification, "(meth)acrylate" refers to any one or both of acrylate and methacrylate, and "(meth)acryloyl" refers to any one or both of acryloyl and methacryloyl. A monomer in the present invention is a compound distinguished from oligomers and polymers and having a weight-average molecular weight of 1,000 or less.

In the present specification, an alkyl group referred to is a group obtained by removing one arbitrary hydrogen atom from a linear or branched alkane. Examples of alkyl groups include a methyl group, an ethyl group, a propyl group, an isopropyl group, a butyl group, an isobutyl group, a sec-butyl group, a tert-butyl group, a pentyl group, a 1-methylbutyl group, a 3-methylbutyl group, a hexyl group, a 1-methylpentyl group, a 4-methylpentyl group, a heptyl group, a 1-methylhexyl group, a 5-methylhexyl group, a 2-ethylhexyl group, an octyl group, a 1-methylheptyl group, a nonyl group, a 1-methyloctyl group, a decyl group, an undecyl group, a dodecyl group, a tridecyl group, a tetradecyl group, a pentadecyl group, a hexadecyl group, a heptadecyl group, an octadecyl group, a nonadecyl group, an eicosyl group, and the like. The same applies to an alkyl group in groups (for example, an alkoxy group, an alkoxycarbonyl group, and the like) containing an alkyl group.

In addition, examples of linear alkylene groups include groups obtained by removing each hydrogen atom bonded to a terminal carbon from a linear alkyl group among the above-mentioned alkyl groups.

In the present specification, an alkenyl group referred to is a group obtained by removing one arbitrary hydrogen atom from a linear or branched alkene. Examples of alkenyl groups include a vinyl group, an allyl group, and the like.

In the present specification, examples of alicyclic rings (non-aromatic hydrocarbon rings) include cycloalkanes and unsaturated hydrocarbon rings. Examples of cycloalkanes include cyclopropane, cyclobutane, cyclopentane, cyclohexane, cycloheptane, cyclooctane, cyclononane, cyclodecane, and the like.

Examples of unsaturated hydrocarbon rings include indene, indane, fluorene, and the like.

In the present specification, a cycloalkyl group referred to represents a group obtained by removing one arbitrary hydrogen atom from cycloalkane. Examples of cycloalkyl groups include a cyclopropyl group, a cyclobutyl group, a cyclopentyl group, a cyclohexyl group, a cycloheptyl group, a cyclooctyl group, a cyclononyl group, a cyclodecyl group, and the like, where a cycloalkyl group having 3 to 12 carbon atoms is preferable.

In the present specification, an alicyclic ring group referred to represents a monovalent group obtained by removing one arbitrary hydrogen atom from a cycloalkyl group or an unsaturated hydrocarbon ring.

In the present specification, a cycloalkylene group represents a divalent group obtained by removing two arbitrary hydrogen atoms from cycloalkane. Examples of cycloalkylene groups include a cyclohexylene group. As the cyclohexylene group, a 1,4-cyclohexylene group is preferable.

In the present specification, in a case where an aromatic ring is referred to, it means any one or both of an aromatic hydrocarbon ring and an aromatic heterocyclic ring.

In the present specification, an aromatic hydrocarbon ring means an aromatic ring forming a ring only with carbon atoms. An aromatic hydrocarbon ring may be a single ring or a fused ring. An aromatic hydrocarbon ring having 6 to 14 carbon atoms is preferable. Examples of aromatic hydrocarbon rings include a benzene ring, a naphthylene ring, an anthracene ring, a phenanthrene ring, and the like. In the present specification, in a case where an aromatic hydrocarbon ring is bonded to another ring, it is sufficient for the aromatic hydrocarbon ring to be substituted on the other ring as a monovalent or divalent aromatic hydrocarbon group.

In the present specification, in a case where an aryl group is referred to, or in a case where a monovalent group is referred to regarding an aromatic hydrocarbon group, both cases represent a monovalent group obtained by removing one arbitrary hydrogen atom from an aromatic hydrocarbon ring. A monovalent aromatic hydrocarbon group is preferably an aromatic hydrocarbon group having 6 to 14 carbon atoms. Examples thereof include a phenyl group, a biphenyl group, a 1-naphthyl group, a 2-naphthyl group, a 1-anthracenyl group, a 2-anthracenyl group, a 3-anthracenyl group, a 4-anthracenyl group, a 9-anthracenyl group, a 1-phenanthryl group, a 2-phenanthryl group, a 3-phenanthryl group, a 4-phenanthryl group, a 9-phenanthryl group, and the like. Among the examples, a phenyl group is preferable.

In the present specification, in a case where an arylene group is referred to, or in a case where a divalent group is referred to regarding an aromatic hydrocarbon group, they represent a divalent group obtained by removing one arbitrary hydrogen atom from the above-mentioned monovalent aromatic hydrocarbon group. Examples of divalent aromatic hydrocarbon groups include a phenylene group, a biphenylene group, a naphthylene group, a phenanthrylene group, and the like, where a phenylene group or a naphthylene group is preferable.

In the present specification, an aromatic heterocyclic ring means an aromatic ring in which a ring is formed by carbon atoms and heteroatoms. Examples of heteroatoms include an oxygen atom, a nitrogen atom, a sulfur atom, and the like. An aromatic heterocyclic ring may be a single ring or a fused ring, and the number of elements constituting the ring is preferably 5 to 20, and more preferably 5 to 14. The number of heteroatoms in the elements constituting the ring is not particularly limited, but it is preferably 1 to 3 and is more preferably 1 or 2. Examples of aromatic heterocyclic rings include a furan ring, a thiophene ring, a pyrrole ring, an imidazole ring, an isothiazole ring, an isoxazole ring, a pyridine ring, a pyrazine ring, a quinoline ring, a benzofuran ring, a benzothiazole ring, a benzoxazole ring, an isoquinoline ring, a phthalazine ring, a naphthyridine ring, a quinoxaline ring, a quinazoline ring, a cinnoline ring, a pteridine ring, a pyridoxazole ring, a pyridothiazole ring, an indole ring, an isoindole ring, a benzimidazole ring, and the like. In the present specification, in a case where an aromatic heterocyclic ring is bonded to another ring, it is sufficient for the aromatic heterocyclic ring to be substituted on the other ring as a monovalent or divalent aromatic heterocyclic group.

In the present specification, in a case where a heteroaryl group or an aromatic heterocyclic group is referred to regarding a monovalent group, it represents a monovalent group obtained by removing one arbitrary hydrogen atom from an aromatic heterocyclic ring. Examples of monovalent aromatic heterocyclic groups include a furyl group, a thienyl group, a pyrrolyl group, an imidazolyl group, an isothiazolyl group, an isoxazolyl group, a pyridyl group, a pyrazinyl group, a quinolyl group, a benzofuranyl group (preferably a 2-benzofuranyl group), a benzothiazolyl group (preferably a 2-benzothiazolyl group), a benzoxazolyl group (preferably a 2-benzoxazolyl group), and the like.

In the present specification, examples of halogen atoms include a fluorine atom, a chlorine atom, a bromine atom, and an iodine atom.

<Curable Composition>

A curable composition of the embodiment of the present invention contains a compound represented by General Formula A, a compound represented by General Formula B, and a polymerization initiator. The inventors of the present invention have found that, in a resin composition in which, in a composition containing the compound represented by General Formula A which is a polyfunctional monomer having a diphenylfluorene skeleton, the compound represented by General Formula B, which has a diphenylfluorene skeleton as in the case of the above-mentioned monomer but is monofunctional, is blended at a constant proportion, the crystallization is inhibited, which makes it possible to produce a high-quality cured substance at a high yield even after long-term storage.

The curable composition of the embodiment of the present invention may contain one kind of the compound represented by General Formula A or two or more kinds thereof. In a case of containing two or more kinds of the compound represented by General Formula A, these compounds are preferably compounds different in any one or both of $Sp^1$ and $Sp^2$ in General Formula A, and more preferably compounds different in any one of $Sp^1$ or $Sp^2$. Furthermore, in the curable composition of the embodiment of the present invention, it is preferable that 90 mol % or more of the compound represented by General Formula A be one kind of the compound, it is more preferable that 95 mol % or more be one kind of the compound, and it is further preferable that 97 mol % or more be one kind of the compound. A preferred embodiment of General Formula A described below will be particularly described for the compound represented by General Formula A which is most contained in the curable composition of the embodiment of the present invention.

The curable composition of the embodiment of the present invention may contain one kind of the compound represented by General Formula B or two or more kinds thereof. In a case of containing two or more kinds of the compound represented by General Formula B, these compounds are preferably compounds different in any of one, two, or three selected from $L^1$, $Sp^1$, and $Sp^2$ in General Formula B. In a case where the curable composition of the embodiment of the present invention contains two or more kinds of the compound represented by General Formula B, the amount ratio of these two or more kinds of the compound is not particularly limited.

In the curable composition of the embodiment of the present invention, a substance amount of the compound represented by General Formula B is 1 to 25 mol % with respect to a substance amount of the compound represented by General Formula A. The substance amount in this case is a total substance amount of a plurality of kinds of compounds in a case where the plurality of kinds of compounds are contained, for both the compound represented by General Formula A and the compound represented by General Formula B. In the curable composition of the embodiment of the present invention, the substance amount of the compound represented by General Formula B is more preferably 2 to 20 mol % and further preferably 4 to 15 mol % with respect to the substance amount of the compound represented by General Formula A.

The compound represented by General Formula B may be contained as an intermediate, an unreacted product, or a partially unreacted product in a manufacturing process of the compound represented by General Formula A. That is, for example, the compound represented by General Formula B may be one obtained as a result of manufacturing without performing chromatography or the like for purifying an intermediate or a final product in the manufacturing process of the compound represented by General Formula A. That is, the curable composition of the embodiment of the present invention may be a crude product containing an intermediate and obtained by manufacturing the compound represented by General Formula A from a specific starting material. Examples of the specific starting material in this case include compounds disclosed in paragraphs 0045 and 0046 of JP2017-36249A.

The curable composition of the embodiment of the present invention may further contain other components in addition to the compound represented by General Formula A, the compound represented by General Formula B, and the polymerization initiator. Specific examples of the other components include non-conjugated-vinylidene-group-containing compounds, (meth)acrylate monomers (monomers other than the compound represented by General Formula A and the compound represented by General Formula B), polymers and monomers which are other than the components described above, and additives such as dispersants, plasticizers, thermal stabilizers, and mold release agents.

[Compounds Represented by General Formulas A and B]

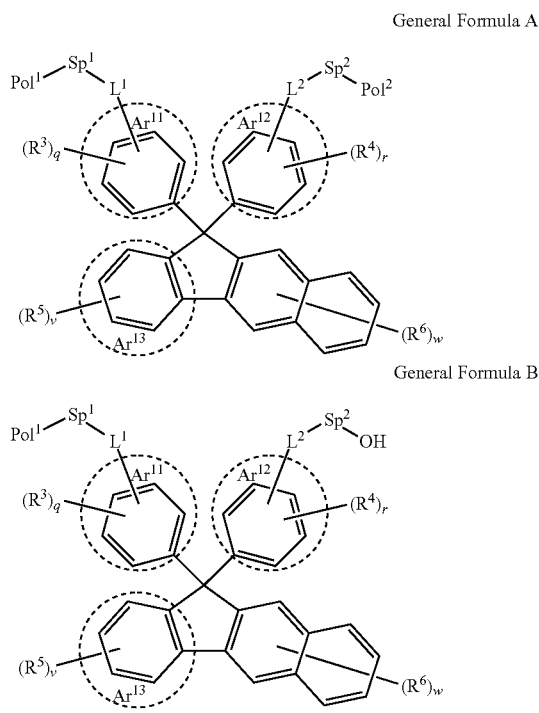

General Formula A

General Formula B

In General Formula A and General Formula B, $Ar^{11}$ and $Ar^{12}$ each independently represent an aryl group containing a benzene ring surrounded by a broken line or a heteroaryl group containing a benzene ring surrounded by a broken line as one of rings constituting a fused ring. As $Ar^{11}$ and $Ar^{12}$, a phenyl group or a naphthyl group is preferable, and a phenyl group is more preferable.

In the curable composition of the embodiment of the present invention, $Ar^{11}$ of General Formula A and $Ar^{11}$ of General Formula B may be the same as or different from each other, but are preferably the same. $Ar^{12}$ of General Formula A and $Ar^{12}$ of General Formula B may be the same as or different from each other, but are preferably the same.

$Ar^{13}$ represents an arylene group containing a benzene ring surrounded by a broken line. As the arylene group represented by $Ar^{13}$, a phenylene group or a naphthylene group is preferable, a 1,2-naphthylene group or a 1,2-phenylene group is more preferable, and a 1,2-phenylene group is further preferable.

In the curable composition of the embodiment of the present invention, $Ar^{13}$ of General Formula A and $Ar^{13}$ of General Formula B may be the same as or different from each other, but are preferably the same.

$L^1$ and $L^2$ each independently represent a single bond, or a linking group selected from the group consisting of —O—, —S—, —C(=O)—, —OC(=O)—, —C(=O)O—, —OC(=O)O—, —SC(=O)—, and —C(=O)S—. In the above description of the linking group, it is assumed that each of the left side is bonded to $Ar^{11}$ and $Ar^{12}$, and each of the right side is bonded to $Sp^1$ and $Sp^2$. $L^1$ and $L^2$ are each independently preferably —O—, —OC(=O)—, —C(=O)O—, or —OC(=O)O—, and more preferably —O— or —OC(=O)—, and further preferably —O—. $L^1$ and $L^2$ may be the same as or different from each other. In General Formula A, $L^1$ and $L^2$ are preferably the same as each other. In General Formula B, it is preferable that $L^1$ and $L^2$ be the same as each other, or $L^2$ be a single bond regardless of $L^1$.

$Sp^1$ and $Sp^2$ each independently represent a single bond or a divalent linking group. Examples of divalent linking groups include the following linking groups, and linking groups selected from the group consisting of combinations of two or more linking groups of the following linking groups.

That is, examples of $Sp^1$ and $Sp^2$ which are divalent linking groups include a linear alkylene group that may have a substituent; a cycloalkylene group that may have a substituent; a divalent aromatic hydrocarbon group that may have a substituent; a divalent aromatic heterocyclic group that may have a substituent; a linking group in which two or more linking groups selected from the group consisting of a linear alkylene group that may have a substituent, a cycloalkylene group that may have a substituent, a divalent aromatic hydrocarbon group that may have a substituent, and a divalent aromatic heterocyclic group that may have a substituent are bonded through a single bond or a linking group selected from the group consisting of —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, and —C(=O)S—; and the like.

In the above description of the linking group, it is assumed that each of the left side is bonded to $L^1$ and $L^2$, and each of the right side is bonded to $Pol^1$, $Pol^2$, and OH group.

$R^{201}$, $R^{202}$, $R^{203}$, and $R^{204}$ each independently represent -Sp$^4$-Pol$^4$ or a halogen atom. Sp$^4$ and Pol$^4$ are respectively synonymous with Sp$^1$ and Pol$^1$. Examples of polymerizable groups represented by Pol$^4$ include the same polymerizable groups as those for Pol$^1$ to be described later, and a preferable range of the polymerizable groups is also the same. Pol$^4$ is preferably a hydrogen atom. -Sp$^4$-Pol$^4$ is preferably a hydrogen atom or an alkyl group which has 1 to 4 carbon atoms and may have a substituent, and is more preferably a hydrogen atom or an unsubstituted alkyl group having 1 to 4 carbon atoms.

$R^{201}$, $R^{202}$, $R^{203}$, and $R^{204}$ each independently preferably are a hydrogen atom, an unsubstituted alkyl group having 1 to 4 carbon atoms, or a halogen atom.

A substituent in a case of referring to the phrase "may have a substituent" regarding substituents in $Sp^1$ and $Sp^2$ is not particularly limited as long as the substituent is not highly desorbable (easily decomposable) such as an acid chloride (—COCl) or -OTf(-O—SO$_2$CF$_3$). Examples thereof include an alkyl group, a cycloalkyl group, an alkoxy group, an acyl group, an acyloxy group, an alkoxycarbonyl group, an amide group, an amino group, a halogen atom, a nitro group, and a cyano group, and a substituent selected from the group consisting of groups composed of a combination of two or more substituents among the above-mentioned substituents. The substituent may be a group represented by -Sp$^5$-Pol$^5$. Sp$^5$ and Pol$^5$ are respectively synonymous with Sp$^1$ and Pol$^1$, and preferable ranges thereof are also the same. The number of substituents is not particularly limited, and there may be 1 to 4 substituents. In a case where there are two or more substituents, the two or more substituents may be the same as or different from each other.

A divalent linking group represented by $Sp^1$ and $Sp^2$ is preferably a linking group selected from the group consisting of a linear alkylene group which has 1 to 30 carbon atoms and may have a substituent, a linking group in which the linear alkylene group which has 1 to 30 carbon atoms and may have a substituent and a cycloalkylene group which has 3 to 10 carbon atoms and may have a substituent are bonded to each other through a single bond, —O—, —C(=O)—, —OC(=O)—, —C(=O)O—, —OC(=O)O—, —NR$^{201}$C(=O)—, or —C(=O)NR$^{202}$—, and a group in which one or two or more non-adjacent —CH$_2$-'s are substituted by —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, or —C(=O)S— in a linear alkylene group which has 2 to 30 carbon atoms and may have a substituent.

In Sp which is a group in which —CH$_2$— is substituted by another divalent group selected from the group consisting of —O—, —S—, —C(=O)—, —OC(=O)—, —C(=O)O—, —OC(=O)O—, —NR$^{201}$C(=O)—, —C(=O)NR$^{202}$—, —OC(=O)NR$^{203}$—, —NR$^{204}$C(=O)O—, —SC(=O)—, and —C(=O)S— in a linear alkylene group having 2 to 30 carbon atoms, it is preferable that the other divalent group be not directly bonded to L. That is, a site substituted by the other divalent group is preferably not an L$^1$ side terminal of Sp$^1$, and an L$^2$ side terminal of Sp$^2$.

It is more preferable that the divalent linking group represented by Sp$^1$ and Sp$^2$ be a linking group selected from the group consisting of a linear alkylene group which has 1 to 20 carbon atoms and may have a substituent, a linking group in which the linear alkylene group which has 1 to 20 carbon atoms and may have a substituent and a cycloalkylene group which has 3 to 6 carbon atoms and may have a substituent are bonded to each other through —O—, —C(=O)—, —OC(=O)—, —C(=O)O—, or —OC(=O)O—, and a group in which one or two or more non-adjacent —CH$_2$-'s are substituted by —O—, —C(=O)—, —OC(=O)—, —C(=O)O—, —OC(=O)O—, —NR$^{201}$C(=O)—, —C(=O)NR$^{202}$—, —OC(=O)NR$^{203}$—, or —NR$^{204}$C(=O)O— in a linear alkylene group which has 2 to 20 carbon atoms and may have a substituent. It is even more preferable that the divalent linking group represented by Sp be a linking group selected from the group consisting of a linear alkylene group which has 1 to 10 carbon atoms and may have a substituent, a linking group in which the linear alkylene group which has 1 to 10 carbon atoms and may have a substituent and a cycloalkylene group which has 3 to 6 carbon atoms and may have a substituent are bonded to each other through —O—, —C(=O)—, —OC(=O)—, or —C(=O)O—, and a group in which one or two or more non-adjacent —CH$_2$-'s are substituted by —O—, —C(=O)—, —OC(=O)—, or —C(=O)O— in a linear alkylene group which has 2 to 10 carbon atoms and may have a substituent. It is particularly preferable that the divalent linking group represented by Sp be a linking group selected from the group consisting of a linear alkylene group which has 1 to 10 carbon atoms and has no substituent or has a methyl group as a substituent, a linking group in which the linear alkylene group which has 1 to 10 carbon atoms and has no substituent or has a methyl group as a substituent and an unsubstituted cycloalkylene group which has 3 to 6 carbon atoms are bonded to each other through —O—, —C(=O)—, —OC(=O)—, or —C(=O)O—, and a group in which one or two or more non-adjacent —CH$_2$-'s are substituted by —O—, —C(=O)—, —OC(=O)—, or —C(=O)O— in a linear alkylene group which has 2 to 10 carbon atoms and which has no substituent or has a methyl group as a substituent.

Sp$^1$ and Sp$^2$ may be the same as or different from each other, but in General Formula A, Sp$^1$ and Sp$^2$ are preferably the same as each other. In General Formula B, Sp$^1$ and Sp$^2$ are the same as each other, or Sp$^1$ is the above-mentioned linking group and Sp$^2$ is a part of the linking group in Sp$^1$, but it is preferable that Sp$^2$ be a single bond regardless of Sp$^1$. The curable composition of the embodiment of the present invention may contain different compounds represented by General Formula B, which includes a combination of such three kinds of Sp$^1$ and Sp$^2$.

In Pol$^1$-Sp$^1$-L$^1$-, Sp$^1$ and L$^1$ are preferably not a single bond at the same time, and both are more preferably not a single bond. In Pol$^2$-Sp$^2$-L$^2$-, Sp$^2$ and L$^2$ are preferably not a single bond at the same time, and both are more preferably not a single bond. However, in General Formula B, a structure in which Sp$^2$ and L$^2$ are single bonds at the same time is also preferable.

In General Formulas A and B, -L$^1$-Sp$^1$- and -L$^2$-Sp$^2$- are both preferably —O-Sp$^{11}$-, —O-Sp$^{12}$-O-Sp$^{13}$-, or —O—C(=O)—Sp$^{12}$-C(=O)—O—Sp$^{13}$-, and more preferably —O-Sp$^{11}$- or —O-Sp$^{12}$-O-Sp$^{13}$-. Sp$^{11}$, Sp$^{12}$, and Sp$^{13}$ each independently represent a linear alkylene group which has 1 to 10 carbon atoms and has no substituent or has a methyl group as a substituent. Sp$^{11}$, Sp$^{12}$, and Sp$^{13}$ are each preferably a linear alkylene group which has 2 to 6 carbon atoms and has no substituent or has a methyl group as a substituent, they are each more preferably a linear alkylene group which has 2 to 4 carbon atoms and has no substituent or has a methyl group as a substituent, and they are each particularly preferably an ethylene group which has no substituent or has a methyl group as a substituent.

R$^3$ to R$^6$ each independently represent a substituent. The substituents represented by R$^3$ to R$^6$ are not particularly limited, and examples thereof include a halogen atom, a halogenated alkyl group, an alkyl group, an alkenyl group, an acyl group, a hydroxy group, a hydroxyalkyl group, an alkoxy group, an aromatic hydrocarbon group, an aromatic heterocyclic group, an aliphatic cyclic group, a cyano group, and the like. The substituents represented by R$^3$ to R$^6$ are preferably a halogen atom, an alkyl group, an alkoxy group, an aromatic hydrocarbon group, or a cyano group; are more preferably a halogen atom, an alkyl group having 1 to 5 carbon atoms, an alkoxy group having 1 to 5 carbon atoms, a phenyl group, or a cyano group; and are particularly preferably a halogen atom, a methyl group, a methoxy group, a phenyl group, or a cyano group. Among them, R$^3$ and $R^4$ are each independently preferably a methyl group or a methoxy group; and $R^5$ is preferably a halogen atom, a methyl group, or a methoxy group, and is more preferably a methoxy group. $R^6$ is preferably a halogen atom, a methyl group, or a methoxy group, and is more preferably a methyl group.

In the curable composition of the embodiment of the present invention, each of $R^3$ to $R^6$ of General Formula A and each of $R^3$ to $R^6$ of General Formula B may be the same as or different from each other, but are preferably the same as each other.

q, r, v, and w are each independently an integer of 0 to 4. q and r are each independently preferably 0 or 1, and both are more preferably 0. It is preferable that v and w be each independently 0 to 2, it is more preferable that v be 0 and w be 1 or 2, and it is further preferable that v be 0 and w be 2.

In the curable composition of the embodiment of the present invention, q, r, v, and w of General Formula A and q, r, v, and w of General Formula B may be the same as or different from each other, but are preferably the same as each other.

$Pol^1$ and $Pol^2$ each independently represent a polymerizable group. Examples of polymerizable groups include polymerizable groups represented by Formulas Pol-1 to Pol-6.

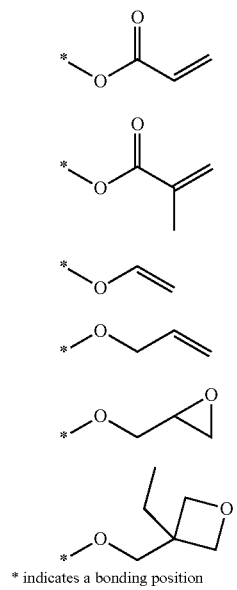

* indicates a bonding position

Among them, (meth)acryloyloxy groups (Pol-1 and Pol-2) are preferable.

In General Formula A, $Pol^1$ and $Pol^2$ may be the same as or different from each other, but are preferably the same as each other. $Pol^1$ of General Formula A and $Pol^1$ of General Formula B may be the same as or different from each other, but are preferably the same as each other.

Examples of specific structures of $Pol^1$-$Sp^1$-$L^1$- and $Pol^2$-$Sp^2$-$L^2$- include the following structures.

In General Formula A, $Pol^1$-$Sp^1$-$L^1$- and $Pol^2$-$Sp^2$-$L^2$- may be the same as or different from each other, but are preferably the same as each other.

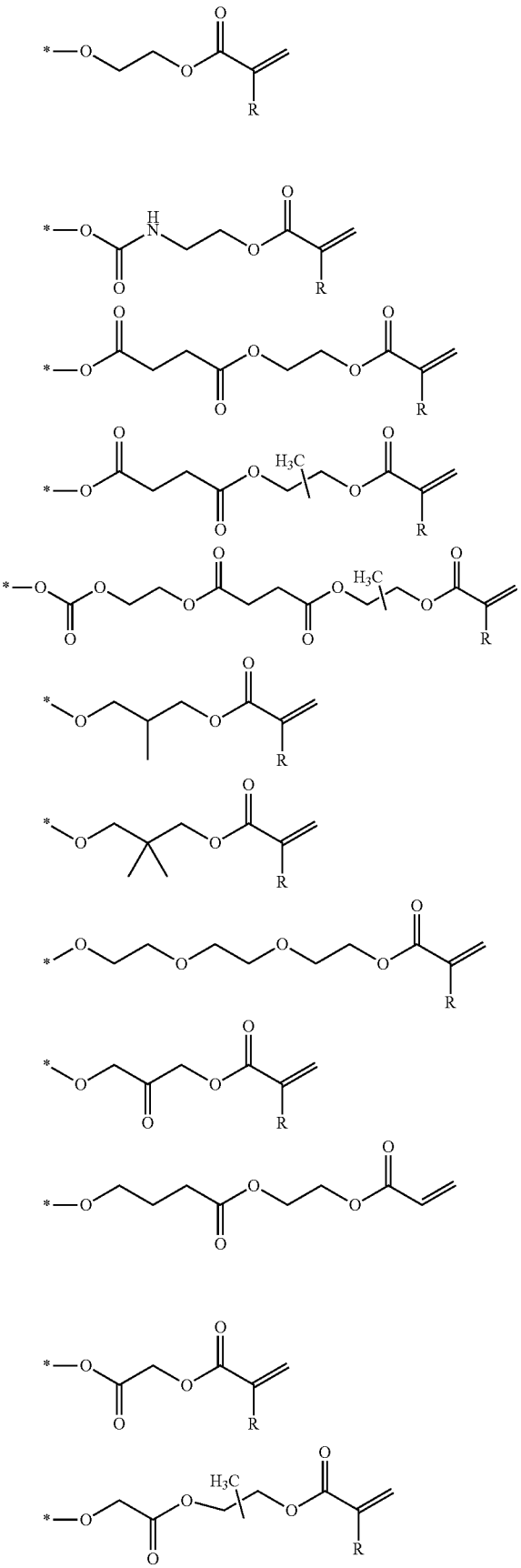

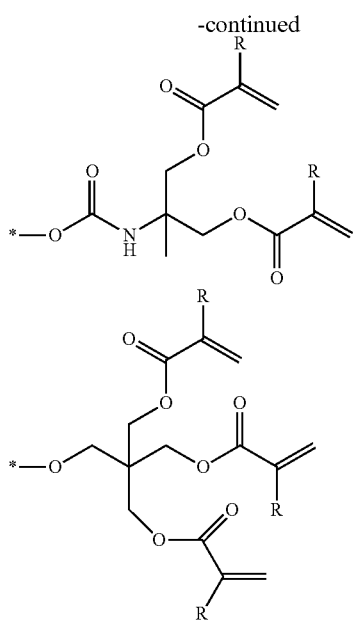

(R is a hydrogen atom or a methyl group, and * indicates a bonding position.)

In the present specification, the following structures show that two partial structures in which methyl groups are respectively bonded to any one carbon of an ethylene group are mixed.

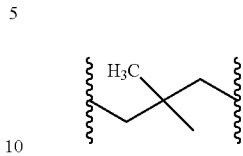

As described above, in a case where the compounds represented by General Formulas A and B have a structure in which a substituent is substituted on a linear alkylene group, structural isomers having different substitution positions of the substituent may be present. The compounds represented by General Formulas A and B may be a mixture of such structural isomers.

Both of the compounds represented by General Formulas A and B are preferably non-liquid crystalline compounds.

Specific examples of the compound represented by General Formula A which is preferably used in the curable composition of the embodiment of the present invention are listed below, but examples are not limited to the following compounds. Me in the following structural formulas represents a methyl group, and Ph represents a phenyl group.

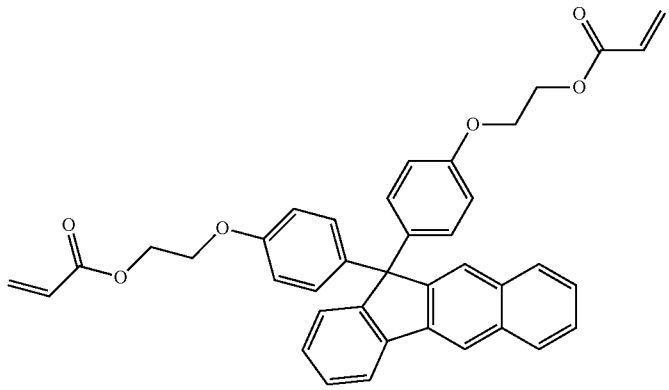

A1

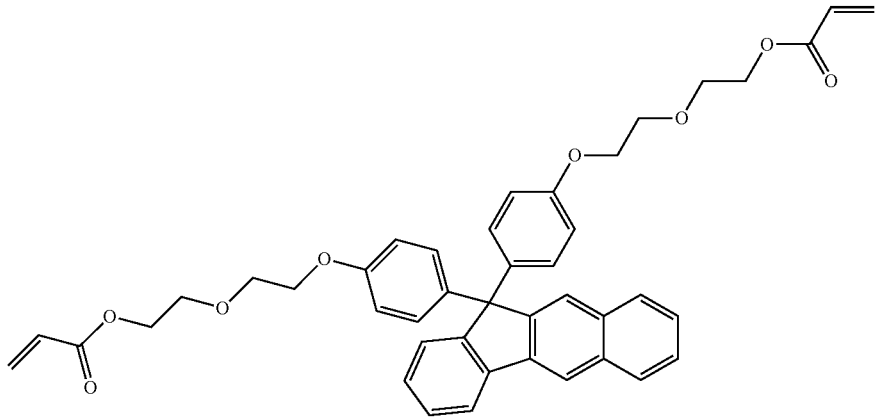

A2

-continued
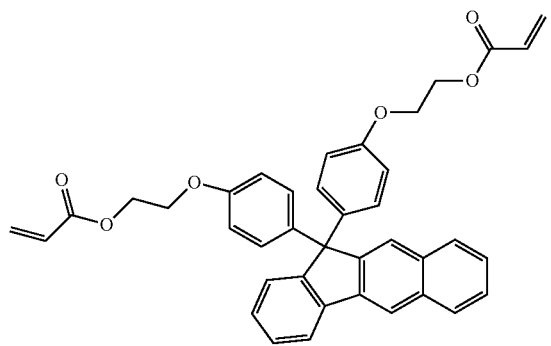
A3
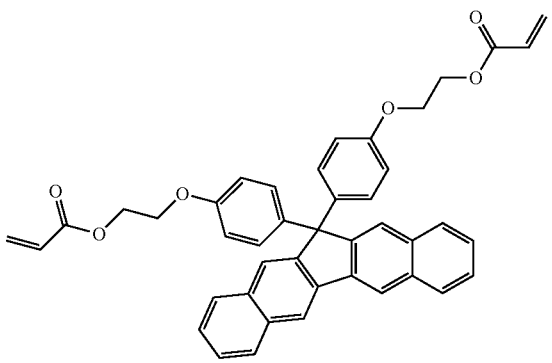
A4
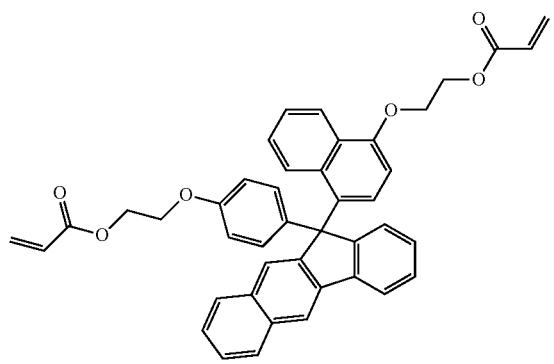
A5
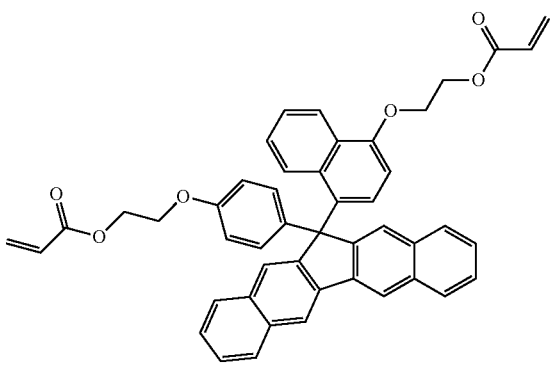
A6
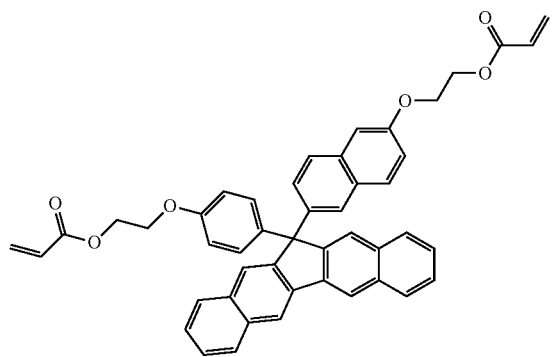
A7
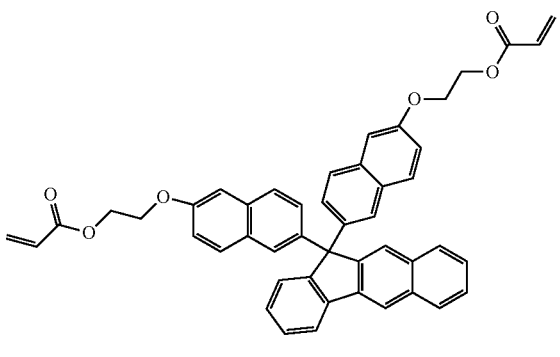
A8
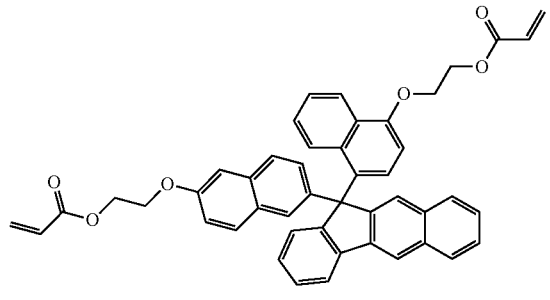
A9
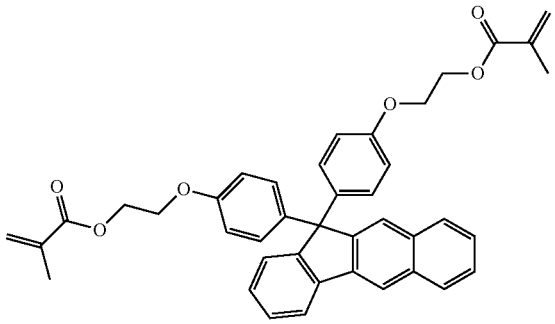
A10

-continued
A11
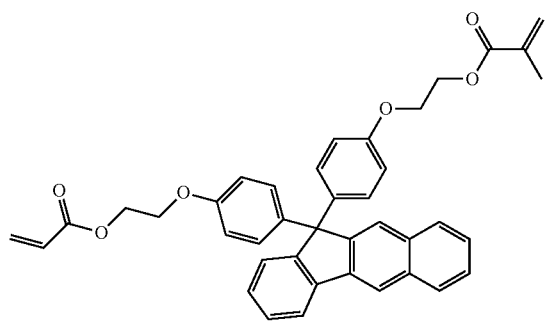
A12
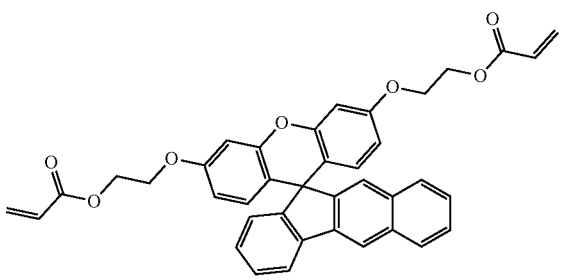
A13
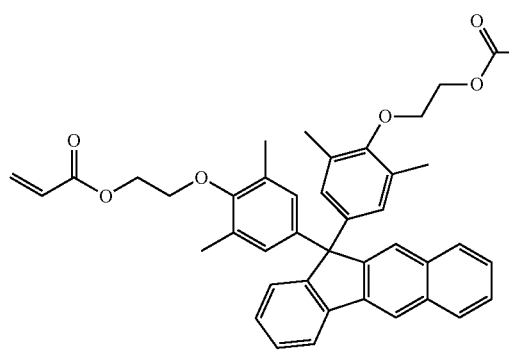
A14
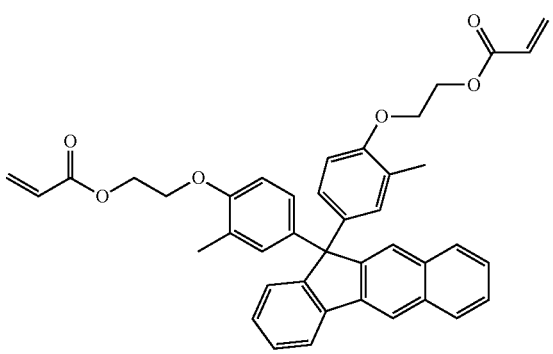
A15
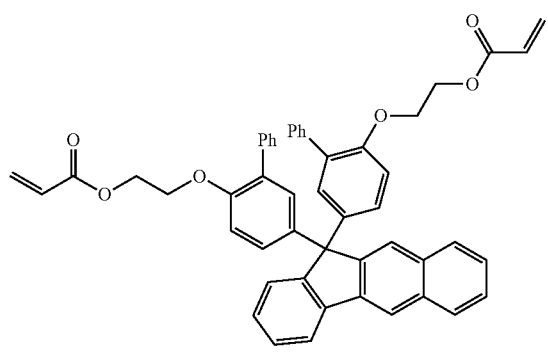
A16
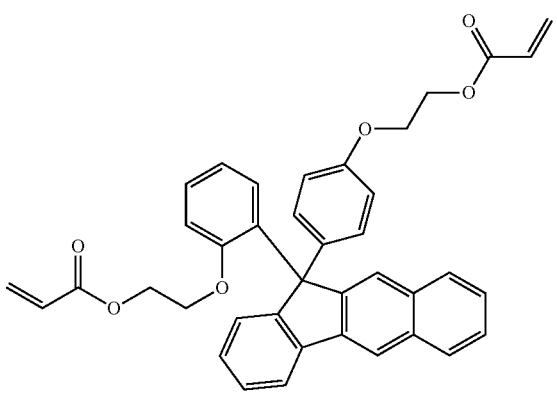
A17
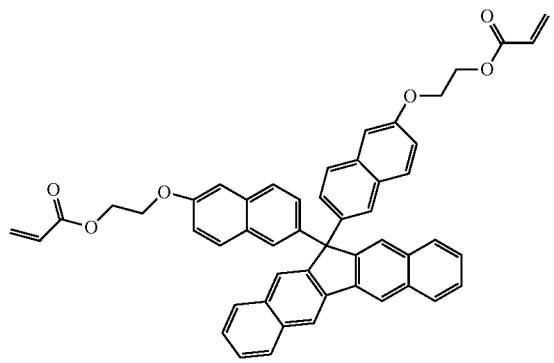
A18
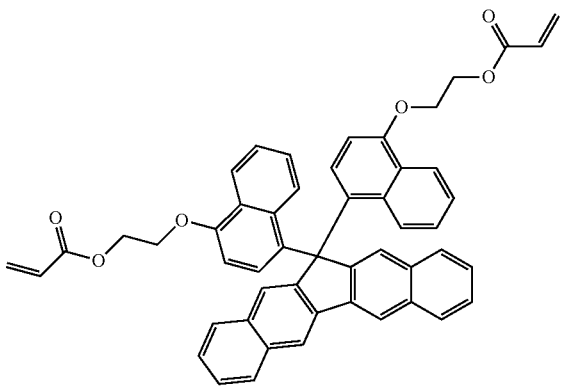

-continued
A19
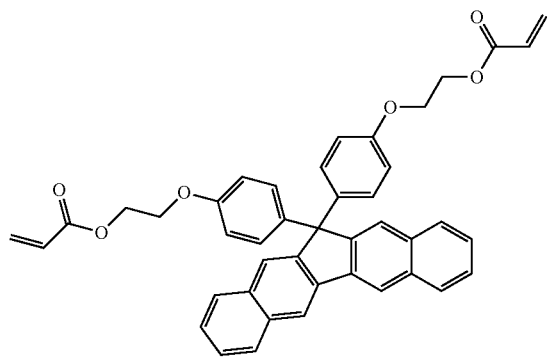
A20
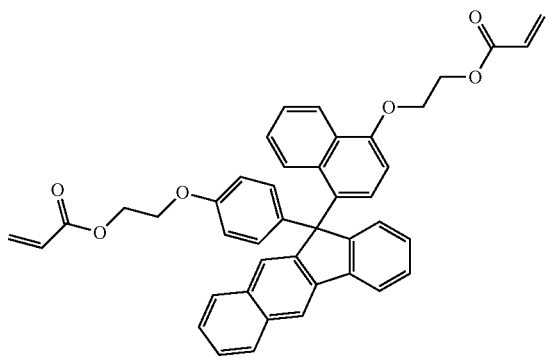
A21
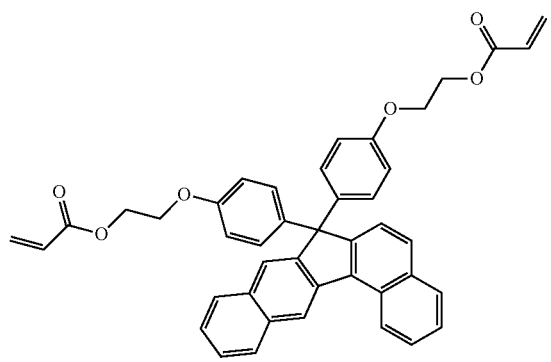
A22
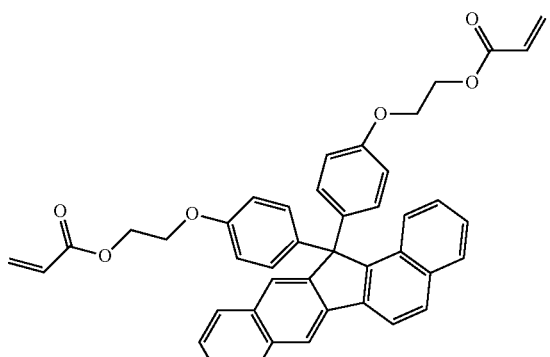
A23
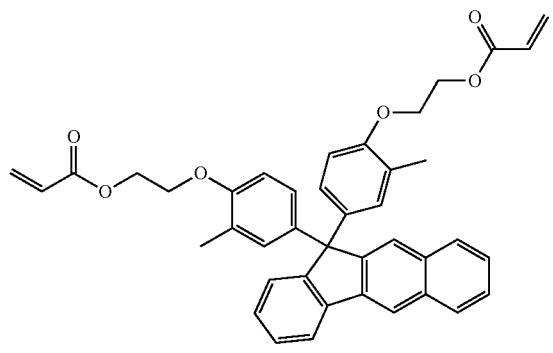
A24
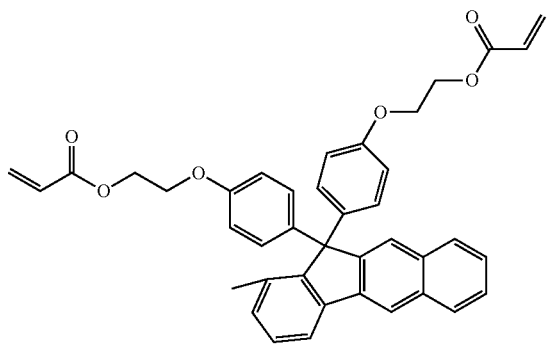
A25
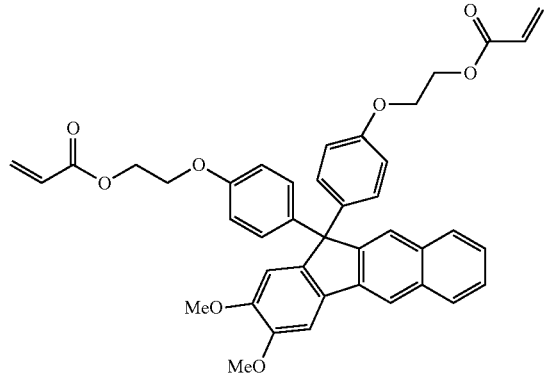
A26
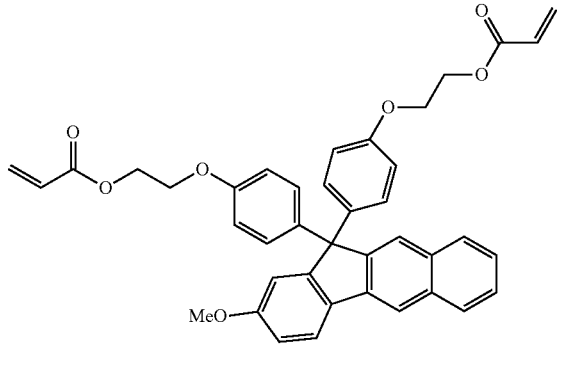

-continued

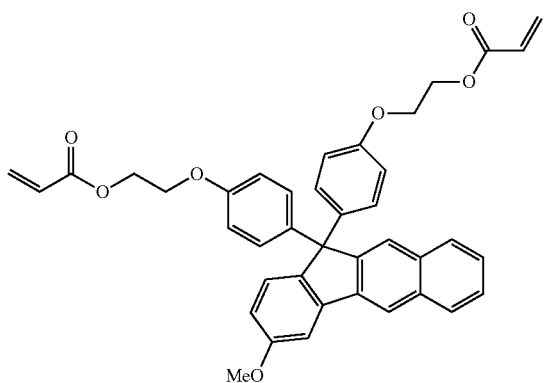
A27

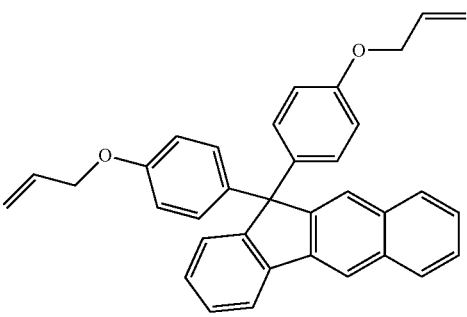
A101

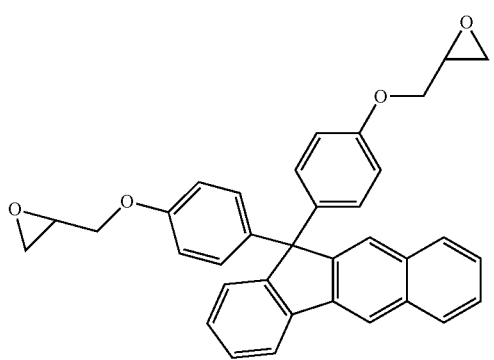
A111

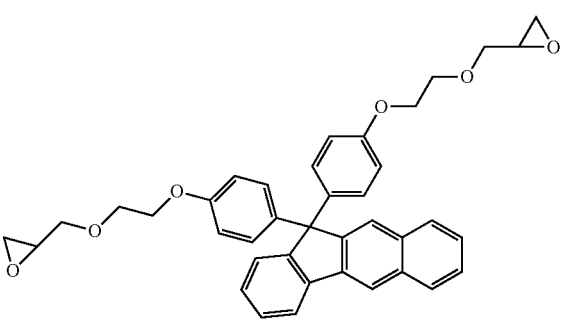
A112

Specific examples of the compound represented by General Formula B preferably used in the curable composition of the embodiment of the present invention include compounds having a structure in which one of polymerizable groups (Pol-1, Pol-2, Pol-4, Pol-5) in the specific examples of the compound represented by General Formula A described above is substituted with an OH group, compounds having a structure in which one of ethyloxy groups, to which the above-mentioned polymerizable group is bonded, in the specific example of the compound represented by General Formula A is substituted with an OH group, and the like. For example, in the curable composition containing the compound represented by Formula A1 and the compound represented by Formula A2 described above, there are examples including one or more selected from the group consisting of compounds represented by Formulas B1, B2, B3, and B4 below as the compound represented by General Formula B.

-continued

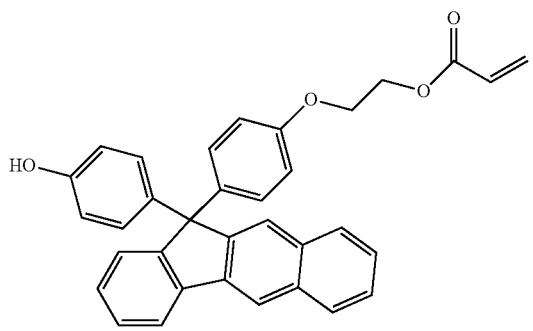
B2

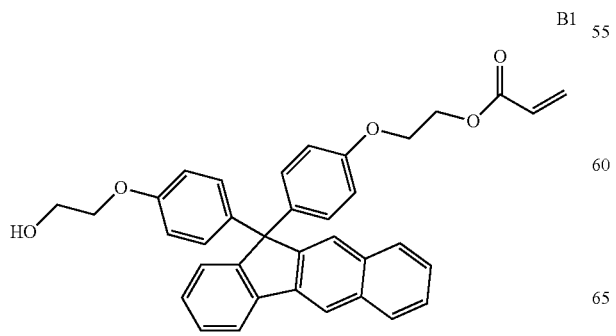
B1

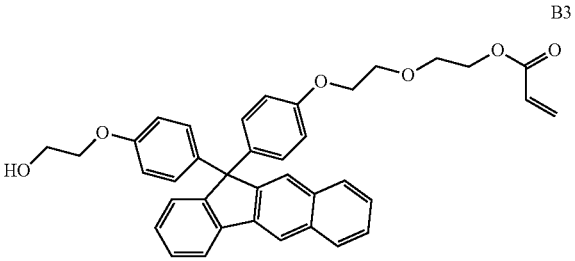
B3

-continued

B4

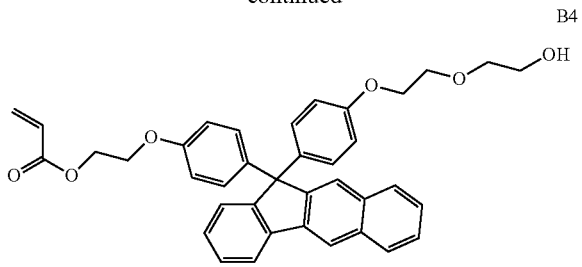

Both of the compound represented by General Formulas A and B have one or two or more asymmetrical carbon atoms in some cases, and stereochemical labels of such asymmetrical carbon atoms each independently may be any of rectus (R) or sinister (S). In addition, the compounds represented by General Formulas A and B may be a mixture of stereoisomers such as optical isomers or diastereoisomers. In other words, the compounds represented by General Formulas A and B may be any kind of stereoisomer, may be any mixture of stereoisomers, or may be a racemate.

A total of the contents of the compounds represented by General Formulas A and B in the curable composition is preferably 30% to 95% by mass, is more preferably 35% by mass to 90% by mass, and is even more preferably 40% to 80% by mass with respect to a total mass of the curable composition. By setting the content of the compound represented by General Formula A within the above-mentioned range, the viscosity of the curable composition and the optical properties (transmittance, Abbe number, and the like) of the produced cured substance can be controlled within preferable ranges.

[Polymerization Initiator]

The curable composition of the embodiment of the present invention contains a polymerization initiator. Examples of the polymerization initiator include a thermal radical polymerization initiator and a photoradical polymerization initiator.

(Thermal Radical Polymerization Initiator)

The curable composition preferably contains a thermal radical polymerization initiator. By thermally polymerizing the curable composition according to this action, it is possible to mold a cured substance having high heat resistance.

Specifically, the following compounds can be used as the thermal radical polymerization initiator. Examples of thermal radical polymerization initiators include 1,1-di(t-hexylperoxy)cyclohexane, 1,1-di(t-butylperoxy)cyclohexane, 2,2-di(4,4-di-(t-butylperoxy)cyclohexyl)propane, t-hexylperoxyisopropyl monocarbonate, t-butylperoxy-3,5,5-trimethylhexanoate, t-butylperoxy laurate, dicumyl peroxide, di-t-butyl peroxide, t-butylperoxy-2-ethylhexanoate, t-hexylperoxy-2-ethylhexanoate, cumene hydroperoxide, t-butyl hydroperoxide, t-butylperoxy-2-ethylhexyl, 2,3-dimethyl-2,3-diphenylbutane, and the like.

A content of the thermal radical polymerization initiator is preferably 0.01% to 10% by mass, more preferably 0.05% to 5% by mass, and even more preferably 0.05% to 2% by mass, with respect to a total mass of the curable composition.

(Photoradical Polymerization Initiator)

The curable composition preferably contains a photoradical polymerization initiator. Specifically, the following compounds can be used as the photoradical polymerization initiator. Examples of photoradical polymerization initiators include bis(2,6-dimethoxybenzoyl)-2,4,4-trimethylpentylphosphine oxide, bis(2,6-dimethylbenzoyl)-2,4,4-trimethylpentylphosphine oxide, bis(2,4,6-trimethylbenzoyl)-2,4,4-trimethylpentylphosphine oxide, bis(2,6-dichlorobenzoyl)-2,4,4-trimethylpentylphosphine oxide, 1-phenyl-2-hydroxy-2-methylpropan-1-one, 1-hydroxycyclohexyl phenyl ketone, 1-(4-isopropylphenyl)-2-hydroxy-2-methylpropan-1-one, 1,2-diphenylethanedione, methylphenyl glyoxylate, 1-[4-(2-hydroxyethoxy)-phenyl]-2-hydroxy-2-methyl-1-propan-1-one, 2-hydroxy-1-{4-[4-(2-hydroxy-2-methyl-propionyl)-benzyl]phenyl}-2-methyl-propan-1-one, 2,2-dimethoxy-1,2-diphenylethan-1-one, 2-methyl-1-(4-methylthiophenyl)-2-morpholinopropan-1-one, 2-benzyl-2-dimethylamino-1-(4-morpholinophenyl)-butanone-1, 2,4,6-trimethylbenzoyl-diphenyl-phosphine oxide, bis(2,4,6-trimethylbenzoyl)-phenylphosphine oxide, and the like.

Among them, as a photoradical polymerization initiator in the present invention, it is possible to preferably use IRGACURE 184 (1-hydroxycyclohexyl phenyl ketone), IRGACURE 819 (bis(2,4,6-trimethylbenzoyl)-phenylphosphine oxide), and IRGACURE 651 (2,2-dimethoxy-1,2-diphenylethan-1-one), which are manufactured by BASF SE, 1-[4-(2-hydroxyethoxy)-phenyl]-2-hydroxy-2-methyl-1-propan-1-one, or 2-methyl-1-(4-methylthiophenyl)-2-morpholinopropan-1-one.

A content of the photoradical polymerization initiator is preferably 0.01% to 5.0% by mass, more preferably 0.05% to 1.0% by mass, and even more preferably 0.05% to 0.5% by mass, with respect to a total mass of the curable composition.

The curable composition preferably contains both photoradical polymerization initiator and thermal radical polymerization initiator, and in this case, a total content of the photoradical polymerization initiator and the thermal radical polymerization initiator is preferably 0.01% to 5% by mass, more preferably 0.05% to 1.0% by mass, and even more preferably 0.05% to 0.5% by mass, with respect to a total mass of the curable composition.

[Non-Conjugated-Vinylidene-Group-Containing Compound]

The curable composition of the embodiment of the present invention may contain a non-conjugated-vinylidene-group-containing compound represented by General Formula (2). By adding the non-conjugated-vinylidene-group-containing compound to the curable composition, the viscosity of a semi-cured substance after photopolymerization or thermal polymerization of the curable composition can be controlled within a specific range, and the heat resistance and the yield of a cured substance obtained by thermal polymerization of this semi-cured substance in a manufacturing method to be described later can be improved.

General Formula (2)

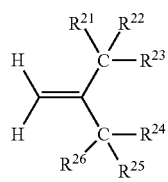

In General Formula (2), $R^{21}$ to $R^{26}$ each independently represent a hydrogen atom or a substituent, and at least two of $R^{21}$ to $R^{26}$ form a ring.

However, the non-conjugated-vinylidene-group-containing compound represented by General Formula (2) does not contain a polymerizable group such as a (meth)acryloyl group.

In General Formula (2), substituents represented by $R^{21}$ to $R^{26}$ are not particularly limited, and for example, it is possible to use substituents such as a halogen atom, a halogenated alkyl group, an alkyl group which may have a substituent, an alkenyl group which may have a substituent, an acyl group which may have a substituent, a hydroxy group, a hydroxyalkyl group which may have a substituent, an aromatic hydrocarbon group which may have a substituent, an aromatic heterocyclic group which may have a substituent, and an alicyclic ring group which may have a substituent.

Among them, $R^{21}$ to $R^{26}$ are each independently preferably a substituent consisting only of a hydrogen atom, an oxygen atom, and a carbon atom, and more preferably a substituent consisting only of a hydrogen atom and a carbon atom. Specifically, $R^{21}$ to $R^{26}$ are preferably a hydrogen atom, an alkyl group which may have a substituent, or an alkenyl group which may have a substituent, and more preferably a hydrogen atom, an alkyl group having 1 to 5 carbon atoms, or an alkenyl group having 2 to 5 carbon atoms.

In the case where at least two of $R^{21}$ to $R^{26}$ form a ring, the case includes a case (A) in which two of $R^{21}$ to $R^{23}$ or two of $R^{24}$ to $R^{26}$ are bonded to each other to form a ring, a case (B) in which one of $R^{21}$ to $R^{23}$ and one of $R^{24}$ to $R^{26}$ are bonded to each other to form a ring, where the case of (B) is preferable.

The ring formed by at least two of $R^{21}$ to $R^{26}$ may be an aromatic ring, a heteroaromatic ring, or a non-aromatic ring. Among them, the ring formed as described above is preferably a non-aromatic ring, and more preferably a non-aromatic hydrocarbon ring. Furthermore, the ring formed may further have a substituent, and examples of the substituent are preferably an alkyl group having 1 to 5 carbon atoms, and more preferably a methyl group, an ethyl group, an n-propyl group, and an isopropyl group. Furthermore, in a case where the ring formed by $R^{21}$ to $R^{26}$ further has substituents on the ring, these substituents may be bonded to each other to form a fused ring.

Furthermore, in the non-conjugated-vinylidene-group-containing compound represented by General Formula (2), the number of rings formed by $R^{21}$ to $R^{26}$ may be one or plural. Furthermore, in a case where there are a plurality of rings formed by $R^{21}$ to $R^{26}$, the rings may be a plurality of rings independent of each other or a fused ring in which a plurality of rings independent of each other are fused to each other, or the rings may be a fused ring in which substituents are bonded to each other in a case where one ring further has the substituents as described above. Among them, the ring formed by $R^{21}$ to $R^{26}$ is more preferably a fused ring in which a plurality of rings are fused, and particularly preferably a fused ring in which substituents are bonded to each other in a case where one ring further has the substituents. In the present specification, an aspect in which two rings are spiro-fused as in a specific example compound to be described later is also included in the fused ring.

Furthermore, among bonded carbon atoms of $R^{21}$ and $R^{22}$ and bonded carbon atoms of $R^{25}$ and $R^{26}$, one carbon atom is preferably an asymmetric carbon atom.

The non-conjugated-vinylidene-group-containing compound represented by General Formula (2) preferably contains a fused ring in which 2 to 5 rings are fused, and more preferably contains a fused ring in which 2 or 3 rings are fused.

Furthermore, the number of ring members of each ring constituting the fused ring is preferably 3 to 10, more preferably 3 to 9, and particularly preferably 4 to 9.

In the case (A) in which two of $R^{21}$ to $R^{23}$ or two of $R^{24}$ to $R^{26}$ are bonded to each other to form a ring, among $R^{21}$ to $R^{26}$, any two of $R^{21}$ to $R^{23}$ are bonded to each other to form a ring, or any two of $R^{24}$ to $R^{26}$ are bonded to each other to form a ring. In this case, it is preferable that only two of one set of any two of $R^{21}$ to $R^{23}$ or any two of $R^{24}$ to $R^{26}$ be bonded to each other to form a ring, and in this case, all of those which are not bonded to each other to form a ring among any two of $R^{21}$ to $R^{23}$ or any two of $R^{24}$ to $R^{26}$ are preferably hydrogen atoms (for example, in a case where any two of $R^{21}$ to $R^{23}$ are bonded to each other to form a ring, $R^{24}$ to $R^{26}$ are preferably all hydrogen atoms).

In the case (B) in which one of $R^{21}$ to $R^{23}$ and one of $R^{24}$ to $R^{26}$ are bonded to each other to form a ring, the non-conjugated-vinylidene-group-containing compound is preferably represented by General Formula (2').

General Formula (2')

(In General Formula (2'), $R^{21}$, $R^{22}$, $R^{25}$, and $R^{26}$ each independently represent a substituent, and A is an atomic group required to form a cyclic structure.)

In General Formula (2'), the preferable range of substituents represented by $R^{21}$, $R^{22}$, $R^{25}$, and $R^{26}$ is the same as the preferable range of those of $R^{21}$ to $R^{26}$ in General Formula (2). Furthermore, $R^{21}$, $R^{22}$, $R^{25}$, and $R^{26}$ may be further bonded to each other to form a ring, and this ring may further have a substituent.

Furthermore, among the set of $R^{21}$ and $R^{22}$ or the set of $R^{25}$ and $R^{26}$, it is preferable that at least one of two substituents be a hydrogen atom in only one of the sets, and it is more preferable that both of two substituents be hydrogen atoms in only one of the sets.

It is preferable that $R^{21}$ and $R^{22}$ be each independently a hydrogen atom or an alkyl group having 1 to 5 carbon atoms, and it is more preferable that only one of $R^{21}$ or $R^{22}$ represent a hydrogen atom or an alkyl group having 1 to 5 carbon atoms and the one do not form a ring by bonding to another group.

In General Formula (2'), A represents an atomic group required to form a cyclic structure, and this cyclic structure is not particularly limited and may be a known cyclic structure. Examples of the cyclic structure include an alicyclic ring (non-aromatic hydrocarbon ring), an aromatic hydrocarbon ring, an aromatic heterocyclic ring, other heterocyclic rings, a lactone ring containing —C(=O)—, and the like.

Among them, A preferably is an atomic group required to form an alicyclic ring having 4 to 10 carbon atoms including a carbon atom linked to A in General Formula (2') and a carbon atom constituting a non-conjugated vinylidene group, and is particularly preferably an atomic group required to form an alicyclic ring having 5 to 9 carbon atoms including a carbon atom linked to A of General Formula (2') and a carbon atom constituting a non-conjugated vinylidene group. This alicyclic ring may have additional substituents, and preferred substituents thereof may be in the same range of the substituents that may be further contained in the rings formed by $R^{21}$, $R^{22}$, $R^{25}$, and $R^{26}$. Furthermore, A may be an unsaturated alicyclic ring or a saturated alicyclic ring, but preferably has at least one unsaturated bond as the whole non-conjugated-vinylidene-group-containing compound represented by General Formula (2'). Furthermore, A may further form a fused ring with the substituent represented by $R^{21}$, $R^{22}$, $R^{25}$ and $R^{26}$.

In General Formula (2'), it is particularly preferable that $R^{21}$, $R^{22}$, $R^{25}$, and $R^{26}$ each independently represent a substituent consisting of only a hydrogen atom and a carbon atom, and A be an alicyclic ring (non-aromatic hydrocarbon ring) structure.

It is preferable that the non-conjugated-vinylidene-group-containing compound represented by General Formula (2') further have an additional double bond structure in addition to a vinylidene group (non-conjugated vinylidene group). The position of the double bond structure in addition to the non-conjugated vinylidene group contained in the non-conjugated-vinylidene-group-containing compound represented by General Formula (2') is not particularly limited. Among them, it is preferable that the double bond structure in addition to the non-conjugated vinylidene group of the non-conjugated-vinylidene-group-containing compound represented by General Formula (2') be located at the ring formed by $R^{21}$, $R^{22}$, $R^{25}$, and $R^{26}$. That is, the ring formed by $R^{21}$, $R^{22}$, $R^{25}$, and $R^{26}$ particularly preferably contains at least one unsaturated hydrocarbon ring and particularly preferably contains at least one unsaturated hydrocarbon ring having only one double bond.

Specific examples of the non-conjugated-vinylidene-group-containing compound represented by General Formula (2) which is preferably used in the present invention are described below, but the present invention is not limited by the following compounds.

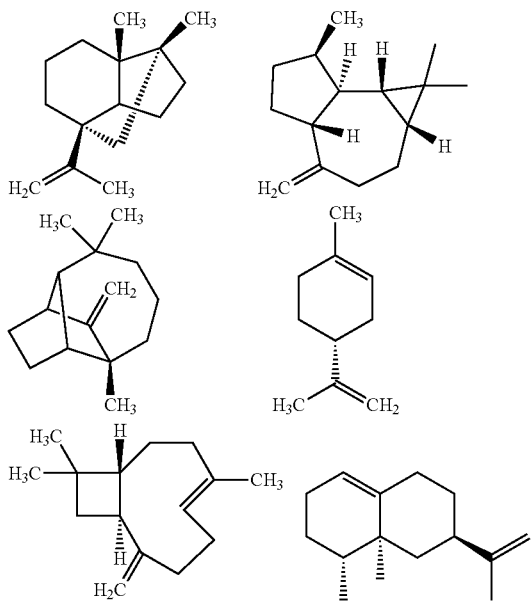

-continued

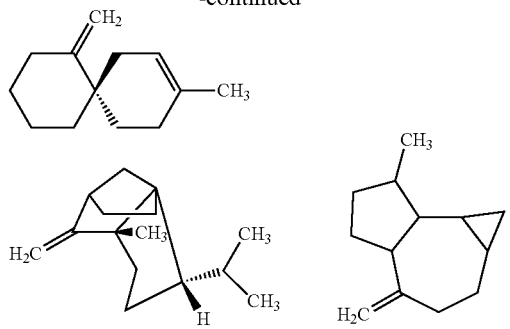

(Molecular Weight)

The molecular weight of the non-conjugated-vinylidene-group-containing compound represented by General Formula (2) is preferably 100 to 400, more preferably 120 to 350, and particularly preferably 130 to 300.

(Obtaining Method)

A method for obtaining the non-conjugated-vinylidene-group-containing compound represented by General Formula (2) is not particularly limited, and the compound may be obtained commercially or may be manufactured synthetically.

In a case of obtaining commercially, for example, β-caryophyllene (manufactured by Tokyo Chemical Industry Co., Ltd.) of the compound (B-5) and the like can be preferably used.

In the case of synthetic manufacturing, a method for manufacturing the non-conjugated-vinylidene-group-containing compound represented by General Formula (2) is not particularly limited, and the compound can be synthesized by a known method. For example, in the case of synthesizing β-caryophyllene which can be preferably used in the present invention among the non-conjugated-vinylidene-group-containing compounds represented by General Formula (2), synthesis can be performed by a method disclosed in J. Am. Chem. Soc. 85, 362 (1964), Tetrahedron Lett., 24, 1885 (1983), and the like.

The curable composition of the embodiment of the present invention preferably contains 0.5% to 30% by mass of the non-conjugated-vinylidene-group-containing compound represented by General Formula (2), more preferably contains 1% to 25% by mass thereof, and particularly preferably contains 2% to 20% by mass with respect to the total amount of the curable composition.

The curable composition of the embodiment of the present invention preferably contains 2% to 50% by mass of the non-conjugated-vinylidene-group-containing compound represented by General Formula (2), more preferably contains 2% to 35% by mass thereof, and particularly preferably contains 2% to 20% by mass with respect to the total amount of the compounds represented by General Formulas A and B.

[Hydroperoxide]

The curable composition of the embodiment of the present invention preferably further contains a hydroperoxide. A hydroperoxide is a peroxide and is a compound having a peroxy group. In the hydroperoxide, one oxygen atom of the peroxy group (—O—O—) is substituted with a hydrogen atom, a hydroperoxy group (—O—O—H) is contained. A hydroperoxide having a hydroperoxide group in the molecule has the effect of promoting chain transfer during the polymerization of the non-conjugated-vinylidene-group-containing compound, which makes it possible to further improve the controllability of a three-dimensional structure in a case of curing the curable composition, and impart deformability to a semi-cured substance.

A method of obtaining the hydroperoxide is not particularly limited, and the hydroperoxide may be obtained commercially or may be manufactured synthetically. In a case of obtaining commercially, for example, PERCUMYL H-80 manufactured by Nippon Oil & Fats Co., Ltd., and the like can be used.

The hydroperoxide is also a compound that functions as a thermal radical polymerization initiator, but in the present invention, the hydroperoxide is preferably added separately from a thermal radical polymerization initiator to be described later.

The content of the hydroperoxide is preferably 0.01% to 10% by mass, more preferably 0.1% to 5% by mass, and even more preferably 0.2% to 2% by mass with respect to a total mass of the curable composition.

[Acidic Phosphoric Acid Ester]

The curable composition of the embodiment of the present invention preferably contains an acidic phosphoric acid ester. Examples of the acidic phosphoric acid ester include a compound represented by General Formula X below.

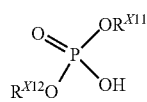

General Formula X

In General Formula X, $R^{X11}$ represents an alkyl group which may have a substituent, and $R^{X12}$ represents a hydrogen atom or an alkyl group which may have a substituent.

Examples of the substituent in the alkyl group which may have the substituent represented by $R^{X11}$ and $R^{X12}$ include substitutable substituents selected from a halogen atom, a halogenated alkyl group, an alkyl group, an alkenyl group, an acyl group, a hydroxy group, a hydroxyalkyl group, an alkoxy group, an aryl group, a heteroaryl group, an alicyclic ring group, a cyano group, an epoxy group, an oxetanyl group, a mercapto group, an amino group, and a (meth)acryloyl group. Among them, the substituent contained in the alkyl group is preferably an alkyl group or an alkoxy group. $R^{X11}$ is preferably an alkyl group or an alkoxy alkyl group, and $R^{X12}$ is preferably a hydrogen atom, an alkyl group, or an alkoxy alkyl group.

Specific examples of the alkyl groups include ethyl, propyl, isopropyl, butyl, isobutyl, sec-butyl, tert-butyl, hexyl, octyl, 2-ethylhexyl, decyl, dodecyl, tetradecyl, hexadecyl, octadecyl, lauryl, stearyl, tetracosyl, isotridecyl, and the like.

The number of carbon atoms of the alkyl group which may have the above-mentioned substituent is preferably 20 or less, more preferably 18 or less, and further preferably 15 or less. In a case where the alkyl group has a substituent, the above-mentioned number of carbon atoms also includes the number of carbon atoms of the substituent. By setting the number of carbon atoms of the alkyl group which may have a substituent within the above-mentioned range, the mold releasability can be controlled, and the continuous moldability can be improved. Furthermore, by setting the number of carbon atoms of the alkyl group which may have a substituent within the above-mentioned range, the compatibility between the acidic phosphoric acid ester and the compounds represented by General Formulas A and B can be enhanced. Accordingly, in the process of curing the curable composition, an acidic phosphoric acid ester phase separation is restrained, which makes it possible to inhibit turbidity in a molded cured substance, and obtain a highly transparent cured substance.

The content of the acidic phosphoric acid ester is preferably 0.003% to 1% by mass, more preferably 0.005% to 1% by mass, further preferably 0.007% to 0.7% by mass, and particularly preferably 0.01% to 0.5% by mass with respect to the total mass of the curable composition. The curable composition of the embodiment of the present invention can exhibit excellent mold transferability and continuous moldability by containing a predetermined amount of the acidic phosphoric acid ester having the structure represented by General Formula X. In addition, the curable composition of the embodiment of the present invention also has excellent mold releasability. Furthermore, by setting the content of the acidic phosphoric acid ester having the structure represented by General Formula X within the above-mentioned range, the mold releasability can be controlled and the continuous moldability can be enhanced. In addition, by containing a predetermined amount of the acidic phosphoric acid ester having the structure represented by General Formula X, phase separation of the acidic phosphoric acid ester is restrained in the process of curing the curable composition, and therefore turbidity is less, which makes it possible to obtain a highly transparent cured substance.

Hereinafter, preferred specific examples of the acidic phosphoric acid ester represented by General Formula X will be described. The acidic phosphoric acid ester used in the present invention is not limited to the following compounds.

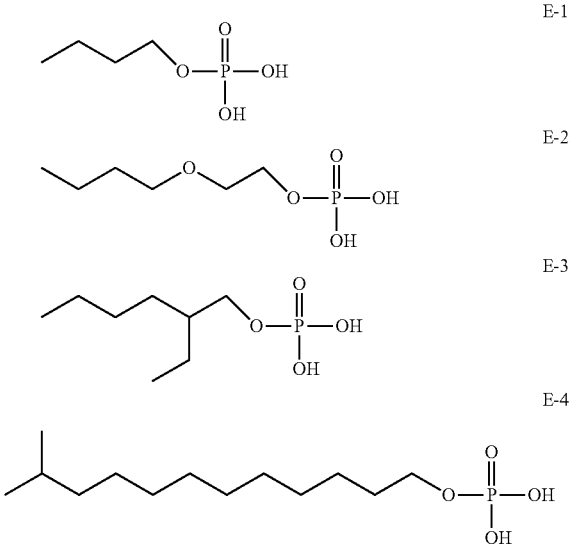

[(Meth)Acrylate Monomer]

The curable composition of the embodiment of the present invention may contain a (meth)acrylate monomer. The (meth)acrylate monomer may be a polyfunctional (meth)acrylate monomer having two or more (meth)acryloyl groups in a molecule, or may be a monofunctional (meth)acrylate monomer having one (meth)acryloyl group in a molecule.

Examples of (meth)acrylate monomers used in the present invention include a monomer 1 (phenoxyethyl acrylate), a monomer 2 (benzyl methacrylate), a monomer 3 (tricyclodecanedimethanol diacrylate), a monomer 4 (dicyclopentanyl acrylate), a monomer 5 (1,6-hexanediol diacrylate), a monomer 6 (1,6-hexanediol dimethacrylate), a monomer 7 (benzyl acrylate), a monomer 8 (isobornyl methacrylate), a monomer 9 (dicyclopentanyl methacrylate), a monomer 10 (dodecyl methacrylate), and the like, which are described below. Furthermore, in addition to the above examples, specific examples of (meth)acrylate monomers include a (meth)acrylate monomer described in paragraphs 0037 to 0046 of JP2012-107191A.

A molecular weight of the (meth)acrylate monomer is preferably 100 to 500.

Monomer 1

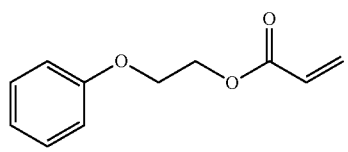

Monomer 2

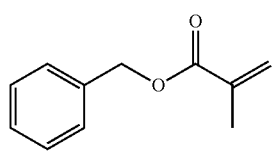

Monomer 3

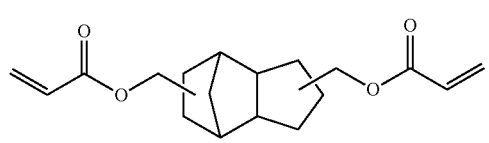

Monomer 4

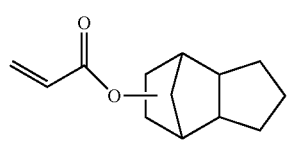

Monomer 5

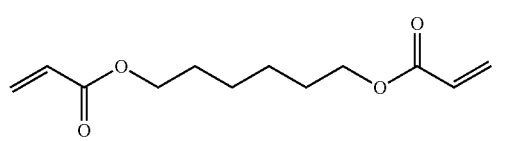

Monomer 6

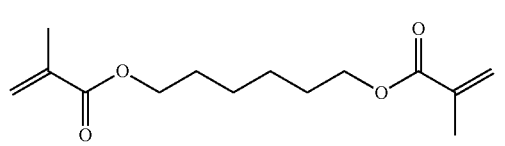

Monomer 7

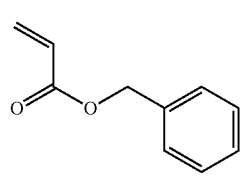

Monomer 8

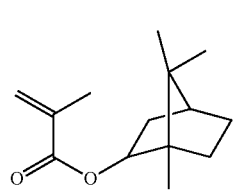

-continued

Monomer 9

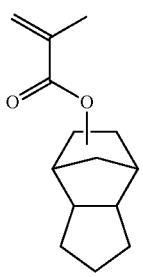

Monomer 10

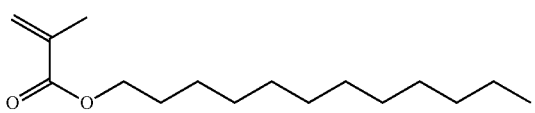

A method of obtaining a (meth)acrylate monomer is not particularly limited, and a commercially available monomer may be used, or it may be manufactured by synthesis. In a case of obtaining a commercially available monomer, for example, it is possible to preferably use VISCOAT #192 PEA (monomer 1) (manufactured by OSAKA ORGANIC CHEMICAL INDUSTRY LTD.), LIGHT ESTER Bz (monomer 2) (manufactured by KYOEISHA CHEMICAL Co., LTD.), A-DCP (monomer 3) (manufactured by Shin-Nakamura Chemical Co., Ltd.), FA-513AS (monomer 4) (manufactured by Hitachi Chemical Co., Ltd.), A-HD-N (monomer 5) (manufactured by Shin-Nakamura Chemical Co., Ltd.), HD-N (monomer 6) (manufactured by Shin-Nakamura Chemical Co., Ltd.), FA-BZA (monomer 7) (manufactured by Hitachi Chemical Co., Ltd.), LIGHT ESTER IB-X (monomer 8) (manufactured by KYOEISHA CHEMICAL Co., LTD.), FA-513M (monomer 9) (manufactured by Hitachi Chemical Co., Ltd.), and LIGHT ESTER L (monomer 10) (manufactured by Kyoeisha Chemical Co., Ltd.).

In a case where the curable composition contains a (meth)acrylate monomer, a content of the (meth)acrylate monomer is preferably 1% to 80% by mass, more preferably 2% to 50% by mass, and even more preferably 3% to 40% by mass, with respect to a total mass of the curable composition. By adjusting an amount of the (meth)acrylate monomer in the curable composition, it is possible to adjust a function of a cured substance to relieve stress in a case of heat change.

[Polymer Having Radically Polymerizable Group in Side Chain]

The curable composition of the embodiment of the present invention may further contain a polymer having a radically polymerizable group in a side chain, in addition to the above-described compound. Because the polymer having a radically polymerizable group in a side chain functions to increase a viscosity of the curable composition, it can also be called a thickener or a thickening polymer. The polymer having a radically polymerizable group in a side chain can be added for adjusting a viscosity of the curable composition.

The polymer having a radically polymerizable group in a side chain may be a homopolymer or may be a copolymer. Among them, the polymer having a radically polymerizable group in a side chain is preferably a copolymer. In a case where the polymer having a radically polymerizable group in a side chain is a copolymer, it is sufficient for a copolymer component on at least one side to have a radically polymerizable group. In addition, in a case where the polymer having a radically polymerizable group in a side chain is a copolymer, the polymer is more preferably a copolymer containing a monomer unit having a radically polymerizable group in the side chain and a monomer unit having an aromatic hydrocarbon group in the side chain.

Examples of radically polymerizable groups include a (meth)acrylate group, a vinyl group, a styryl group, an allyl group, and the like. The polymer having a radically polymerizable group in a side chain preferably contains 5% to 100% by mass, more preferably contains 10% to 90% by mass, and even more preferably contains 20% to 80% by mass of repeating units having a radically polymerizable group.

Specific examples of the polymer having a radically polymerizable group in a side chain which is preferably used in the present invention are listed below, but the polymer having a radically polymerizable group in a side chain is not limited to the following structures. Each of the specific examples shown below is a copolymer, and each copolymer includes adjacent structural units which are illustrated secondly or thirdly therefrom. For example, a specific example described at the top is an allyl methacrylate-benzyl methacrylate copolymer.

In the structural formulas below, Ra and Rb each independently represent hydrogen or a methyl group. A plurality of Ra's in one polymer may be the same as or different from each other. In addition, n represents an integer of 0 to 10, preferably represents 0 to 2, and more preferably represents 0 or 1.

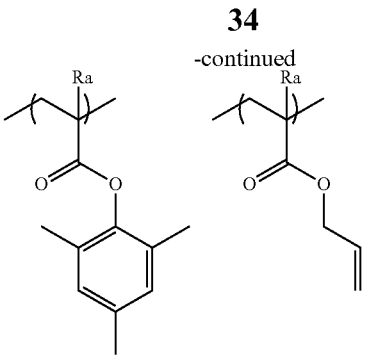

-continued

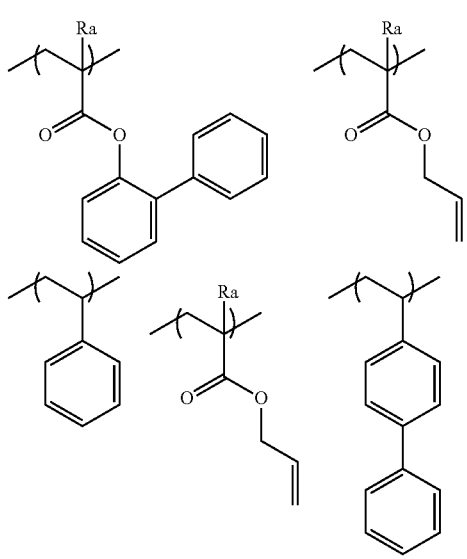

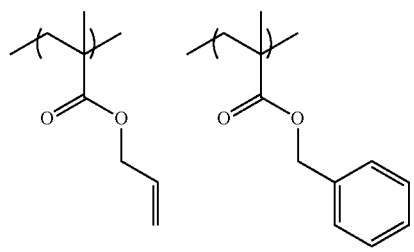

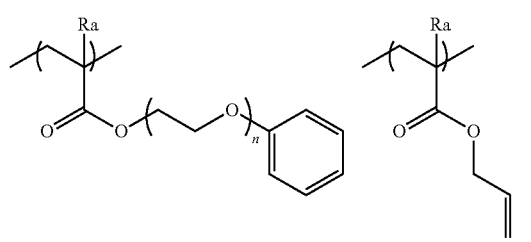

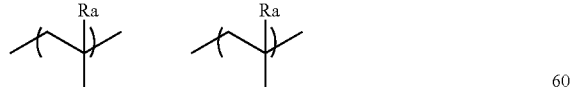

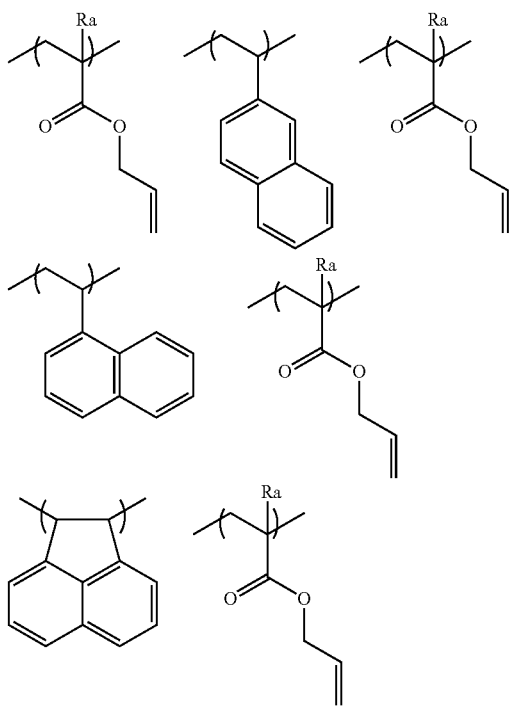

-continued
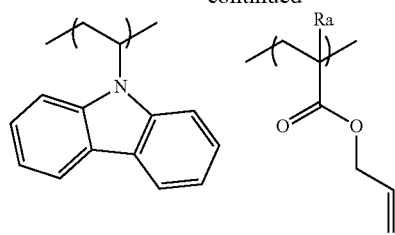
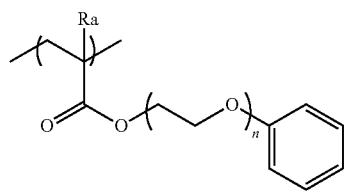
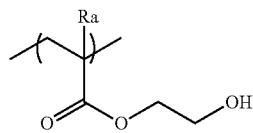
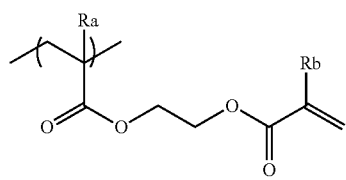
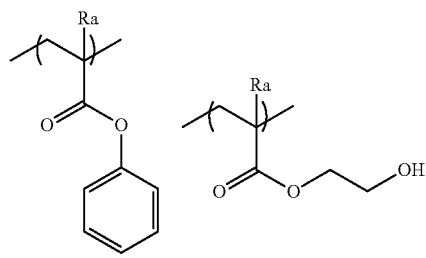
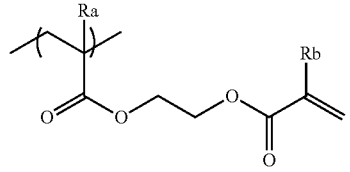
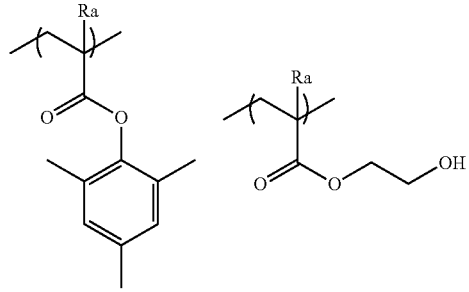
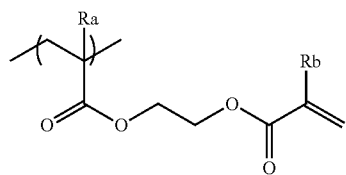
-continued
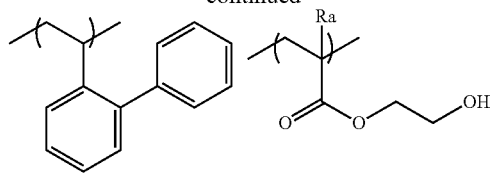
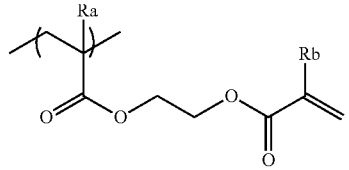
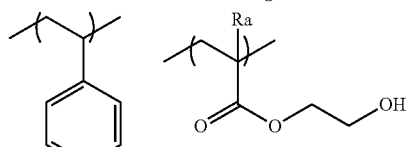
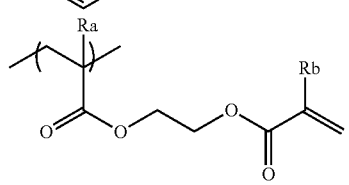
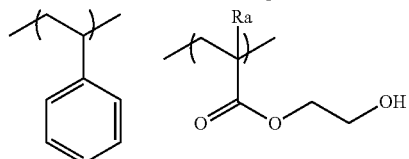
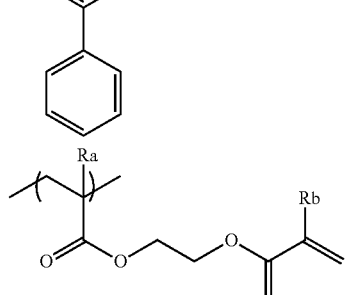
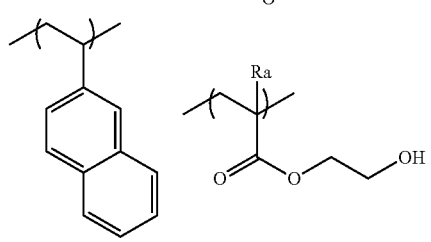
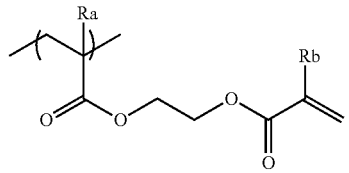
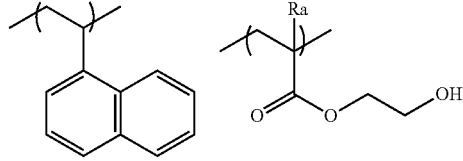

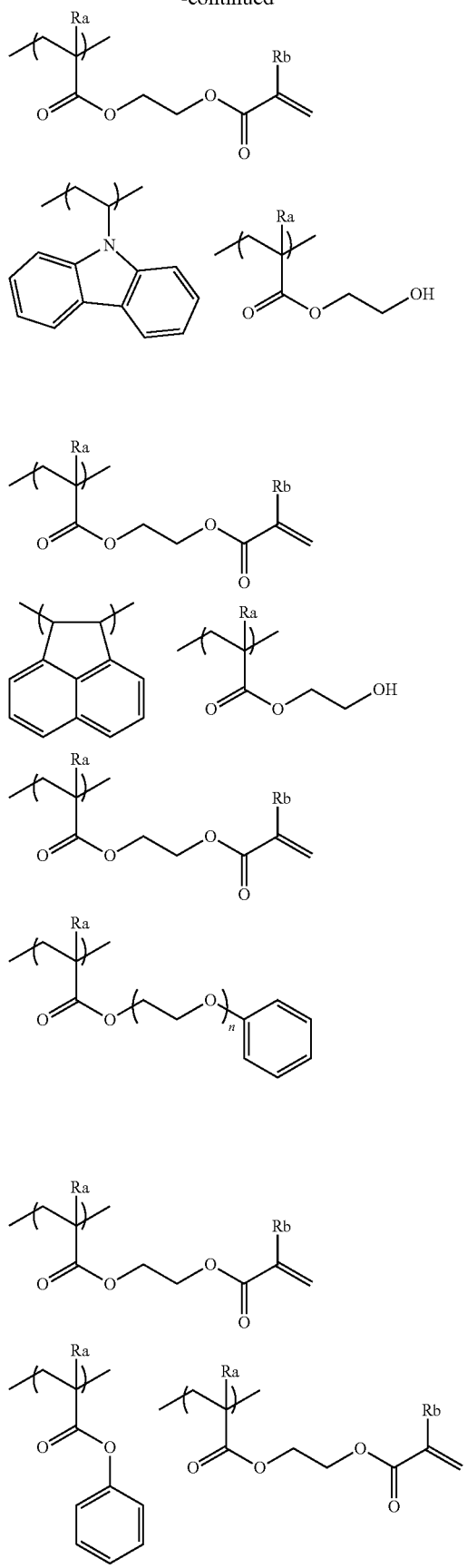
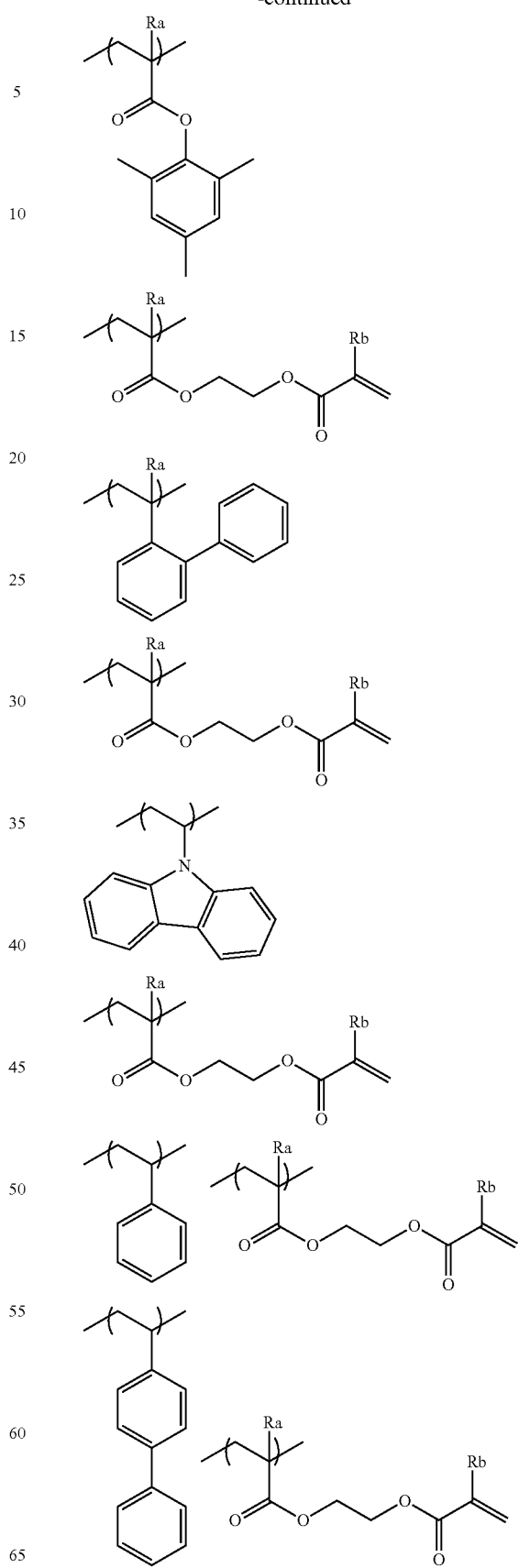

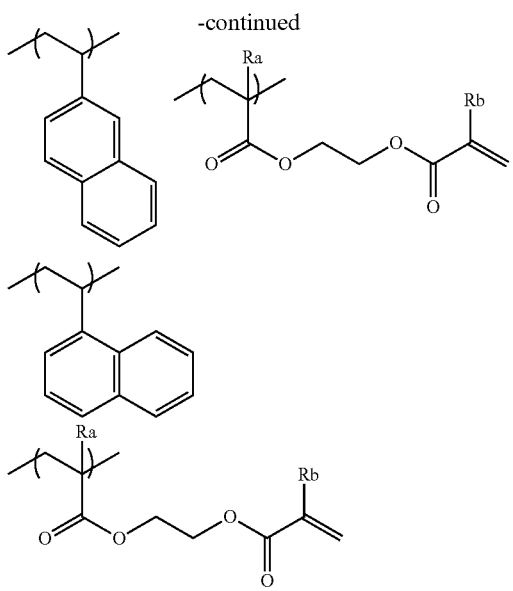

A molecular weight (weight-average molecular weight) of the polymer having a radically polymerizable group in a side chain is preferably 1,000 to 10,000,000, more preferably 5,000 to 300,000, and even more preferably 10,000 to 200,000. In addition, a glass transition temperature of the polymer having a radically polymerizable group in a side chain is preferably 50° C. to 400° C., more preferably 70° C. to 350° C., and even more preferably 100° C. to 300° C.

A content of the polymer having a radically polymerizable group in a side chain is preferably 40% by mass or less, more preferably 30% by mass or less, and even more preferably 25% by mass or less with respect to a total mass of the curable composition. A content of the polymer having a radically polymerizable group in a side chain may be 0% by mass, and an aspect in which the polymer having a radically polymerizable group in a side chain is not added is also preferable.

[Other Additives and the Like]

Unless contrary to the gist of the present invention, the curable composition of the embodiment of the present invention may contain polymers and monomers which are other than the components described above, and additives such as dispersants, plasticizers, thermal stabilizers, and mold release agents.

A viscosity of the curable composition of the embodiment of the present invention is preferably 20,000 mPa·s or less, is more preferably 15,000 mPa·s or less, is even more preferably 13,000 mPa·s or less, and is particularly preferably 10,000 mPa·s or less. In a case where the viscosity of the curable composition is within the above-mentioned range, it is possible to improve handleability in a case of molding a cured substance, and thereby it is possible to mold a high-quality cured substance. A viscosity of the curable composition is preferably 2,000 mPa·s or more, is more preferably 3,000 mPa·s or more, is even more preferably 4,000 mPa·s or more, and is particularly preferably 5,000 mPa·s or more.

<Cured Substance>

[Abbe Number of Cured Substance]

An Abbe number of the cured substance obtained by curing the curable composition of the embodiment of the present invention is not particularly limited, but it is preferably 35 or less, more preferably 30 or less, even more preferably 29 or less, and particularly preferably 28 or less. In addition, an Abbe number of the cured substance of the embodiment of the present invention is not particularly limited, but it is preferably 1 or more, is more preferably 3 or more, is even more preferably 5 or more, and is particularly preferably 7 or more.

An Abbe number (vd) of the cured substance is a value measured using a Kalnew precision refractometer KPR-2000 (manufactured by Shimadzu Device Corporation). Specifically, the curable composition is poured into a transparent glass mold having a diameter of 20 mm and a thickness of 2 mm, and heated at 200° C. in an atmosphere having an oxygen concentration of 1% or less to mold a cured substance (a heating step), and an Abbe number (vd) of this cured substance is measured. The Abbe number (vd) of the cured substance is calculated by the following formula. In a case of molding a cured substance, an ultraviolet irradiation step may be employed instead of the above-described heating step, or both of the heating step and the ultraviolet irradiation step may be employed.

$$vd=(nd-1)/(nF-nC)$$

Where, nd represents a refractive index at the wavelength of 587.56 nm, nF represents a refractive index at the wavelength of 486.13 nm, and nC represents a refractive index at the wavelength of 656.27 nm.

[Method for Manufacturing Cured Substance]

The cured substance can be manufactured by a method including a step of photocuring the curable composition of the embodiment of the present invention, and/or a step of thermally curing the same. The method for manufacturing the cured substance preferably includes a step of forming a semi-cured substance by irradiating the curable composition with light or heating the curable composition, and a step of forming a cured substance by irradiating the obtained semi-cured substance with light or heating the obtained semi-cured substance.

[Step of Forming Semi-Cured Substance]

The step of forming a semi-cured substance preferably includes a transfer step. The transfer step is a step of pressing a mold against the curable composition mentioned above. In the transfer step, the other mold is pressed against the curable composition injected into the one of the pair of molds to spread the curable composition.

The mold used in the method for manufacturing a cured substance is preferably a mold that has been subjected to a chromium nitride treatment. Thereby, a favorable mold releasability can be obtained in a release step to be performed in subsequent steps, and manufacture efficiency of an optical member can be increased.

Examples of chromium nitride treatments include a method of forming a chromium nitride film on a mold surface. Examples of methods of forming a chromium nitride film on a mold surface include a Chemical Vapor Deposition (CVD) method and a Physical Vapor Deposition (PVD) method. The CVD method is a method of forming a chromium nitride film on a substrate surface by reacting a source gas containing chromium and a source gas containing nitrogen at a high temperature. In addition, the PVD method is a method of forming a chromium nitride film on a substrate surface by utilizing an arc discharge (arc type vacuum deposition method). In this arc type vacuum deposition method, a cathode (evaporation source) made of chromium, for example, is placed in the vacuum vessel, an arc discharge is caused between the cathode and the wall of the vacuum vessel via a trigger, ionization of the metal by are plasma is performed at the same time as vaporizing the cathode, a negative voltage is applied to the substrate, and about several tens of mTorr (1.33 Pa) of a reaction gas (for example, a nitrogen gas) is put into the vacuum vessel, and thereby the ionized metal and the reaction gas are reacted on the surface of the substrate to form a compound film. In the present invention, the chromium nitride treatment on a mold surface is performed by the CVD method or the PVD method.

In general, a mold can be heated while applying pressure to contents by combining two molds, and in a case where a low-viscosity composition is injected into the mold, leakage into the mold clearance is caused. For this reason, a curable composition to be injected into a mold preferably has a viscosity of a certain level or higher level. In order to adjust a viscosity of a curable composition, the above-described polymer having a radically polymerizable group in a side chain may be added to the curable composition.

After the step of pressing the mold, a step of forming a semi-cured substance is provided. The semi-cured substance can be obtained by semi-curing the curable composition injected into the mold. In the step of forming a semi-cured substance, light irradiation or heating is performed. In the present specification, such a step can also be called a semi-curing step.

In the semi-curing step, the curable composition of the embodiment of the present invention is subjected to at least one of light irradiation or heating. In the semi-curing, there is generally no difference in Abbe number of a finally obtained cured substance, regardless of whether light irradiation is performed or heating is performed. In the semi-curing step, it is preferable to form a semi-cured substance in which a complex viscosity at 25° C. and a frequency of 10 Hz is $10^5$ to $10^8$ mPa·s.

The term "semi-cured substance" in the present specification refers to a substance obtained by polymerizing a curable composition, and it is in a state of not being completely solid but having fluidity to some extent. In a case where a complex viscosity of a polymer of a curable composition is $10^5$ to $10^8$ mPa·s at 25° C. and a frequency of 10 Hz, this polymer is a semi-cured substance. That is, polymers in which an upper limit value of a complex viscosity at 25° C. and a frequency of 10 Hz is less than $1.0 \times 10^9$ mPa·s are considered to fall within a range of semi-cured substances. On the other hand, the term "cured substance" refers to a substance obtained by curing a curable composition by polymerization, and it is in a state of being completely solid.

Light used in the light irradiation is preferably ultraviolet rays or visible light, and is more preferably ultraviolet rays. For example, a metal halide lamp, a low pressure mercury lamp, a high pressure mercury lamp, an ultrahigh pressure mercury lamp, a germicidal lamp, a xenon lamp, a light emitting diode (LED) light source lamp, and the like are suitably used. An atmosphere during light irradiation is preferably air or an inert-gas-purged atmosphere, and is more preferably an atmosphere in which air is purged with nitrogen until an oxygen concentration reached 1% or less.

In a case of providing a heating and semi-curing step in the semi-curing step, heating and semi-curing are preferably carried out such that a complex viscosity of a semi-cured substance after heating is $10^5$ to $10^8$ mPa·s at 25° C. and a frequency of 10 Hz.

The present invention may relate to a semi-cured substance manufactured by the above-described method. Such a semi-cured substance can be preferably used for a method for manufacturing a cured substance to be described later. A preferred range of the complex viscosity of the semi-cured substance is the same as the preferred range of the complex viscosity of the semi-cured substance in the above-described step of forming a semi-cured substance.

After the light irradiation step, a photoradical polymerization initiator may not be contained in the semi-cured substance at all because it has been completely consumed, or a photoradical polymerization initiator may remain in the semi-cured substance.

In addition, a glass transition temperature of the semi-cured substance is preferably −150° C. to 0° C., more preferably −50° C. to 0° C., and particularly preferably −20° C. to 0° C.

[Step of Forming Cured Substance]

The step of forming a cured substance preferably includes a polymerization step of obtaining a cured substance by thermal polymerization in which the semi-cured substance is put into a molding mold for deformation under pressure and heating is performed, or by photopolymerization in which the semi-cured substance is irradiated with light. In the present specification, such a step can also be called a curing step. Light irradiation conditions and heating conditions in the step of forming a cured substance are the same as the conditions in the semi-curing step described above.

In a case where the curing step is the thermal polymerization step, a molding mold used in the polymerization step is also referred to as a thermoforming mold. In general, the thermoforming mold preferably has a configuration in which two molding molds can be heated while applying pressure to contents by combining the two molding molds. In addition, in the method for manufacturing a cured substance, it is more preferable to use a mold as the molding mold in the thermal polymerization step of obtaining a cured substance. As such a thermoforming mold, it is possible to use a mold described in, for example, JP2009-126011A. In addition, the mold is preferably a mold that has been subjected to a chromium nitride treatment.

In the thermal polymerization step, the semi-cured substance put into a molding mold is deformed under pressure, and heated for thermal polymerization, and thereby a cured substance is obtained. Deformation under pressure and heating may be performed at the same time, heating may be performed after deformation under pressure, or deformation under pressure may be performed after heating. Among them, it is preferable to perform deformation under pressure and heating at the same time. In addition, it is also preferable to further perform heating at a high temperature after a pressure applied has become stable, after deformation under pressure and heating are performed at the same time.

In the thermal polymerization step, the semi-cured substance is heated at a temperature of 150° C. or higher and cured, and thereby a cured substance is obtained.

A heating temperature is 150° C. or higher, is preferably 160° C. to 270° C., is more preferably 165° C. to 250° C., and is even more preferably 170° C. to 230° C.

In this curing step, it is preferable to perform deformation under pressure together with heating. Thereby, an inverted shape of an inner surface of the mold can be accurately transferred to the cured substance.

A pressure for the deformation under pressure is preferably 0.098 MPa to 9.8 MPa, more preferably 0.294 MPa to 4.9 MPa, and particularly preferably 0.294 MPa to 2.94 MPa.

A time of the thermal polymerization is preferably 30 to 1,000 seconds, more preferably 30 to 500 seconds, and particularly preferably 60 to 300 seconds. An atmosphere in the thermal polymerization is preferably air or an inert-gaspurged atmosphere, and is more preferably an atmosphere in which air is purged with nitrogen until an oxygen concentration reached 1% or less.

A release step is provided after the curing step. In a case where the thermal polymerization is performed in the curing step, the mold is preferably separated from the cured substance within a temperature range of 150° C. to 250° C. in the release step. By setting the temperature in the release step within the above-mentioned range, the mold can be easily separated from the cured substance, and manufacture efficiency can be increased.

Hereinbefore, although the example of the method for manufacturing a cured substance of the embodiment of the present invention was described, the configuration of the present invention is not restricted thereto, and it can be suitably changed within the range which does not deviate from the present invention. For example, a mold used in the transfer step and the semi-curing step may be used as it is in the curing step; or the mold may be pulled away from the semi-cured substance to be separated after performing the semi-curing step, and the semi-cured substance may be moved into another mold (thermoforming mold) to perform the curing step. In this case, the mold used in the semi-curing step and the curing step is preferably subjected to the above-described chromium treatment.

Furthermore, in the semi-curing step, the curable composition in the mold may be irradiated with light and also may be heated. Thereby, a semi-cured substance having a desired degree of curing can be obtained reliably.

[Semi-Cured Substance]

The semi-cured substance can be formed by semi-curing the curable composition. The semi-cured substance is preferably a semi-cured substance manufactured by a method for manufacturing a semi-cured substance. In addition, in the semi-cured substance, a complex viscosity at 25° C. and a frequency of 10 Hz is preferably $10^5$ to $10^8$ mPa·s.

The cured substance of the embodiment of the present invention may be formed by curing the semi-cured substance described above.

<Optical Member>

The cured substance of the embodiment of the present invention can be preferably used for an optical member.

The type of optical member is not particularly limited, but the cured substance of the embodiment of the present invention can be suitably used especially for light-transmissive optical members (so-called passive optical members). Examples of optically-functional devices including such optical members include various types of display devices (a liquid crystal display, a plasma display, and the like), various types of projector devices (an overhead projector (OHP), a liquid crystal projector, and the like), optical fiber communication devices (an optical waveguide, a light amplifier, and the like), image-capturing devices such as a camera and a video, and the like.

Examples of passive optical members include lenses, prisms, prism sheets, panels (plate-like molded objects), films, optical waveguides (a film-like optical waveguide, a fiber-like optical waveguide, and the like), optical discs, LED sealants, and the like. The passive optical member may have an arbitrary coating layer or an arbitrary additional functional layer, if necessary. For example, the passive optical member may have a protective layer for preventing mechanical damage of a coating surface caused by friction or abrasion; a light-absorbing layer for absorbing a light having an undesirable wavelength which is a cause of degradation of inorganic particles, base materials, and the like; a permeation blocking layer for inhibiting or preventing permeation of reactive small molecules such as moisture or oxygen gas; an antiglare layer; an antireflection layer; a layer of low refractive index; and the like. Specific examples of coating layers include a transparent conductive film or gas barrier film consisting of an inorganic oxide coating layer or inorganic nitride coating layer, a gas barrier film or hard coating film consisting of an organic coating layer, and the like. As a coating method for forming the coating layer, it is possible to use a known coating method such as a vacuum deposition method, a CVD method, a sputtering method, a dip coating method, and a spin coating method.

[Lens Base Material]

The optical member may be a lens base material. That is, a lens base material can be manufactured using the curable composition of the embodiment of the present invention. In the present specification, the "lens base material" refers to a single member capable of exhibiting a lens function. The lens base material manufactured using the curable composition of the embodiment of the present invention exhibits a small Abbe number. Preferably, by suitably adjusting the type of monomer constituting the curable composition, it is possible to control a refractive index of the lens base material in an arbitrary value, and furthermore, it is possible to obtain the lens base material having high refractive properties, light transmittance, and lightweight properties.

A film and a member may be provided on a surface and the periphery of the lens base material depending on use environments and usage applications of lenses. For example, a protective film, an antireflection film, a hard coating film, or the like may be formed on the surface of the lens base material. Furthermore, a lens base material manufactured using the cured substance of the embodiment of the present invention can be made into a compound lens laminated with one or more other lens base materials selected from a glass lens base material and a plastic lens base material.

The periphery of the lens base material may be fitted to be fixed in a base-material-holding frame or the like. However, these films, frames, and the like are members added to the lens base material, and therefore they are distinguished from the lens base material itself referred to in the present specification.

In a case of using the lens base material for lenses, the lens base material alone may be used as a lens as it is, or the above-mentioned films, frames, other lens base materials, and the like may be added and used as a lens. The type and a shape of a lens formed of the lens base material are not particularly limited, but the maximum thickness thereof is preferably 0.1 to 10 mm. The maximum thickness is more preferably 0.1 to 5 mm, and is particularly preferably 0.15 to 3 mm. In addition, the lens base material is preferably a circular shape having the maximum diameter of 1 to 1,000 mm. The maximum diameter is more preferably 2 to 200 mm, and is particularly preferably 2.5 to 100 mm.

The lens base material is preferably used for lenses for imaging devices such as mobile phones or digital cameras; lenses for capturing devices such as TV or video cameras; lenses for in-vehicle devices; and endoscope lenses.

<Cemented Lens>

A cemented lens can be manufactured by allowing a lens base material or a lens manufactured using the curable composition of the embodiment of the present invention to adhere to another lens using a lens adhesive.

[Other Lenses]

The type of other lenses is not particularly limited, and examples thereof include a disk-shaped convex lens, a concave lens, a meniscus lens, an aspheric lens, and a cylindrical lens having a cylindrical lens surface, a ball lens, a rod lens, and the like. In addition, a material of the other lenses is not particularly limited as long as the other lens is a glass lens, a resin lens, or a compound lens.

(Glass Lens)

As a glass lens, known glass lenses can be used without limitation. Examples of commercially available glass lenses include BK7 manufactured by Ohara Corporation.

Similar glass lenses can be used also in a case where a compound lens includes a glass lens.

(Resin Lens and Compound Lens)

A resin lens means a lens consisting of a resin cured substance.

In the present specification, a compound lens means a lens having a layer consisting of glass and a resin layer. The resin layer is a layer consisting of a resin cured substance. Each layer included in the compound lens may be a lens (single lens), and in this case, optical axes of each of the single lens (a line connecting curvature centers of both spherical surfaces) preferably coincide with each other. The compound lens may have a resin layer on a surface or inner side thereof.

[Manufacture of Cemented Lenses]

The cemented lens can be obtained by superimposing two lenses using the lens adhesive, and then curing the adhesive to form the adhesive layer as described later. The curing is preferably performed after removing air bubbles mixed into the adhesive after the superimposition.

Curing of the adhesive can be performed by light irradiation or heating. The curing is preferably performed by carrying out at least light irradiation. In addition, a step of further heating may be performed after light irradiation.

A thickness of the adhesive layer is preferably 10 to 50 μm, and more preferably 20 to 30 μm. In a case where the thickness is 10 μm or more, an effect of absorbing ultraviolet rays can be sufficiently obtained. In addition, in a case where the thickness is 50 μm or less, it is possible to improve transmittance in a short wavelength range (400 to 430 nm) of visible light while exhibiting high adhesiveness.

A refractive index of the adhesive layer at a wavelength of 587 nm is preferably 1.51 or more, more preferably 1.53 or more, and even more preferably 1.55 or more. The reason for this is because a difference in refractive indices from a lens to be cemented becomes small.

In addition, a cutoff wavelength of the adhesive layer having a film thickness of 30 m is preferably 380 nm or less, more preferably 385 nm or less, and even more preferably 390 nm or less. A wavelength at which transmittance of the adhesive layer becomes 0.5% or less is defined as a cutoff wavelength. The transmittance of the adhesive layer can be measured using a spectrophotometer (for example, UV-2550 manufactured by Shimadzu Corporation).

EXAMPLES

Hereinafter, the features of the present invention will be more specifically described with reference to examples and comparative examples. In the following examples, materials, amounts used, ratios, details of treatments, treatment procedures, and the like may be suitably modified without departing from the gist of the present invention. Accordingly, the scope of the present invention should not be limitedly interpreted by the following specific examples.

The reaction with acrylic acid was performed using intermediate compositions having different degrees of purity to prepare a composition in which proportions of the compounds represented by General Formula A (compounds A1 and A2) and the compounds represented by General Formula B (compounds B1 to B4) were different. The component proportion was confirmed by an HPLC area ratio.

Synthesis Example

<Synthesis of Intermediate 1>

An intermediate 1 was synthesized according to the description in paragraph 0073 of JP2017-36249A.

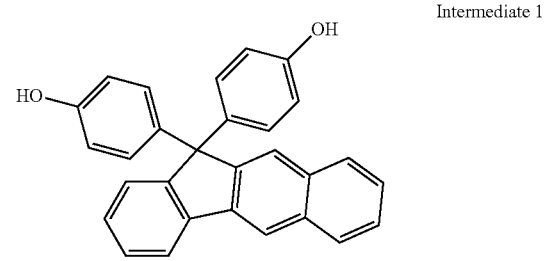 [SMILES: Oc1ccc(C2(c3ccc(O)cc3)c3ccccc3-c3cc4ccccc4cc32)cc1]

Intermediate 1

<Synthesis of Intermediate Composition>

Synthesis of Intermediate Composition 1

75.0 g of the intermediate 1, 39.2 g of ethylene carbonate, 3.7 g of potassium carbonate, and 63 mL of cyclopentyl methyl ether were added to a 1 L three-neck flask equipped with a cooling pipe to perform the reaction in an oil bath at 120° C. for 8 hours. The reaction liquid was cooled, and 40 mL of cyclopentyl methyl ether, 50 mL of water, and 14 g of sodium hydroxide were added and stirred at 60° C. for 4 hours. After confirming the disappearance of ethylene carbonate, 100 mL of cyclopentyl methyl ether was further added to perform a liquid separation operation. After further washing the organic layer with a saline solution, a concentration operation was performed, and then 172 g of an intermediate composition 1 was obtained as a 50% by weight of a cyclopentyl methyl ether solution. The molar ratio of each of the components in the intermediate composition 1 was measured by high-performance liquid chromatography, and it was found that intermediate 2a/intermediate 2b/intermediate 2c=96.7%/0.3%/3.0%.

Synthesis of Intermediate Composition 2

Synthesis was performed in the same manner as the intermediate composition 1 except that the reaction was performed in an oil bath at 120° C. for 4 hours. The proportion of each of the components in the intermediate composition 2 was measured by high-performance liquid chromatography, and it was found that intermediate 2a/intermediate 2b/intermediate 2c=92.8%/7.0%/0.2%.

Synthesis of Intermediate Composition 3

Synthesis was performed in the same manner as the intermediate composition 1 except that the reaction was performed in an oil bath at 135° C. for 8 hours. The proportion of each of the components in the intermediate composition 3 was measured by high-performance liquid chromatography, and it was found that intermediate 2a/intermediate 2b/intermediate 2c=91.1%/0.1%/8.8%.

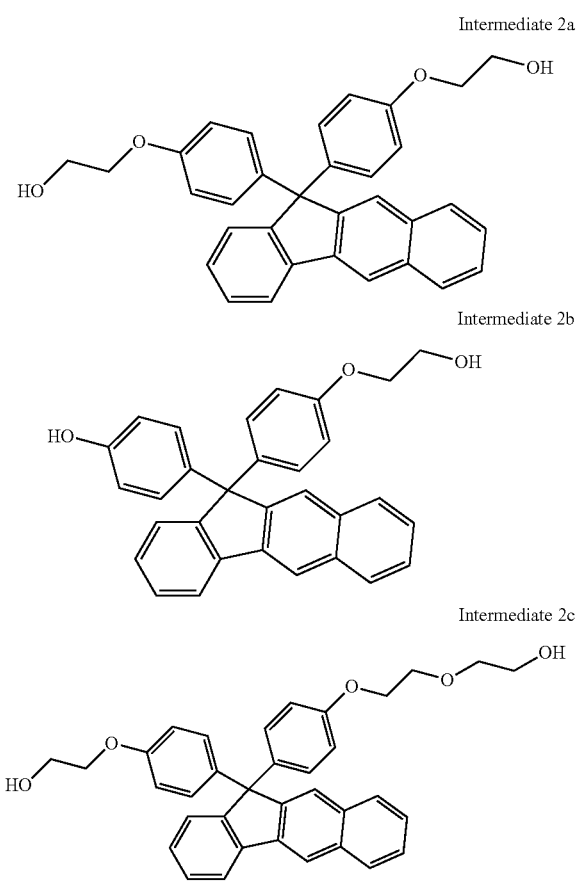

Intermediate 2a

Intermediate 2b

Intermediate 2c

<Synthesis of Monomer Composition>
Synthesis of Monomer Composition 1

80 g of the intermediate composition 1, 19.5 g of acrylic acid, 3.1 g of p-toluenesulfonic acid monohydrate, 0.2 g of p-methoxyphenol, and 50 mL of toluene were added to a 500 mL three-neck flask equipped with a cooling pipe and a Dean-Stark apparatus to perform the reaction in an oil bath at 125° C. for 6 hours while distilling off water. Subsequently, after cooling the reaction liquid to room temperature, 150 mL of ethyl acetate and 28 g of activated carbon Shirasagi A (manufactured by Osaka Gas Chemicals Co., Ltd.) were added and stirred for 1 hour. Celite filtration was performed, and after washing the filtrate with a saturated aqueous solution of sodium bicarbonate and water, dehydration was performed with magnesium sulfate. After the magnesium sulfate was filtered off, the solvent was distilled off by an evaporator to obtain 46 g of a monomer composition 1.

Synthesis of Monomer Composition 2

Synthesis was performed in the same manner as the monomer composition 1 except that the reaction was performed in an oil bath at 125° C. for 4 hours.

Synthesis of Monomer Composition 3

Synthesis was performed in the same manner as the monomer composition 1 except that the reaction was performed in an oil bath at 125° C. for 3 hours.

Synthesis of Monomer Composition 4

Synthesis was performed in the same manner as the monomer composition 1 except that the reaction was performed in an oil bath at 125° C. for 2 hours.

Synthesis of Monomer Composition 5

Synthesis was performed in the same manner as the monomer composition 1 except that the reaction was performed in an oil bath at 125° C. for 1 hour.

Synthesis of Monomer Composition 6

Synthesis was performed in the same manner as the monomer composition 1 except that the intermediate composition 2 was used instead of the intermediate composition 1.

Synthesis of Monomer Composition 7

Synthesis was performed in the same manner as the monomer composition 4 except that the intermediate composition 2 was used instead of the intermediate composition 1.

Synthesis of Monomer Composition 8

Synthesis was performed in the same manner as the monomer composition 4 except that the intermediate composition 3 was used instead of the intermediate composition 1.

Preparation of Comparative Monomer Composition 1

The monomer composition 1 was repeatedly purified by silica gel column chromatography using hexane/ethyl acetate as a developing solvent to obtain a comparative monomer composition 1.

Synthesis of Comparative Monomer Composition 2

Synthesis was performed in the same manner as the monomer composition 5 except that the intermediate composition 2 was used instead of the intermediate composition 1.

The proportion of each of the components was measured by high-performance liquid chromatography for each of the monomer compositions prepared above. The results are shown in Table 1.

TABLE 1

|  |  |  | Monomer composition 1 | Monomer composition 2 | Monomer composition 3 | Monomer composition 4 | Monomer composition 5 | Monomer composition 6 | Monomer composition 7 | Monomer composition 8 | Comparative monomer composition 1 | Comparative monomer composition 2 |
|---|---|---|---|---|---|---|---|---|---|---|---|---|
| Moral ratio in monomer composition | General Formula A | A1 | 95.9 | 94.8 | 93.2 | 88.3 | 78.6 | 92.1 | 85.1 | 82.6 | 96.9 | 78.0 |
|  |  | A2 | 2.8 | 2.6 | 2.4 | 2.1 | 1.8 | 0.1 | 0.1 | 8.0 | 2.9 | 0.1 |
|  | General Formula B | B1 | 0.8 | 1.9 | 3.5 | 8.4 | 18.1 | 0.7 | 7.7 | 8.5 | 0.2 | 14.8 |
|  |  | B2 | 0.3 | 0.3 | 0.3 | 0.3 | 0.3 | 7.0 | 7.0 | 0.1 | 0 | 7.0 |
|  |  | B3 + B4 | 0.2 | 0.4 | 0.6 | 0.9 | 1.2 | 0.1 | 0.1 | 0.8 | 0 | 0.1 |

TABLE 1-continued

| | Monomer composition 1 | Monomer composition 2 | Monomer composition 3 | Monomer composition 4 | Monomer composition 5 | Monomer composition 6 | Monomer composition 7 | Monomer composition 8 | Comparative monomer composition 1 | Comparative monomer composition 2 |
|---|---|---|---|---|---|---|---|---|---|---|
| Moral ratio of compound represented by General Formula B to compound represented by General Formula A | 1.32% | 2.67% | 4.60% | 10.62% | 24.38% | 8.46% | 17.37% | 10.38% | 0.20% | 28.04% |

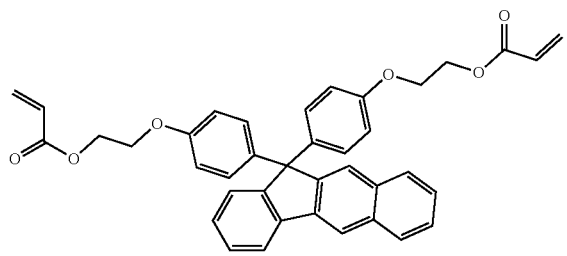

Compound A1

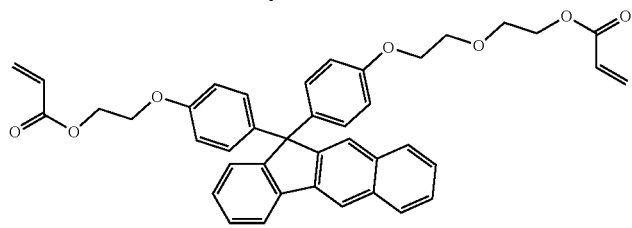

Compound A2

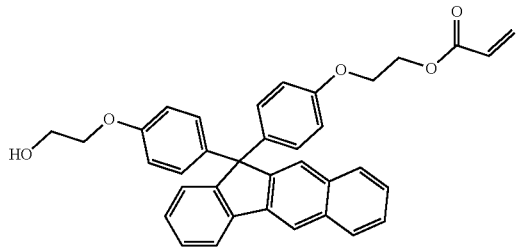

Compound B1

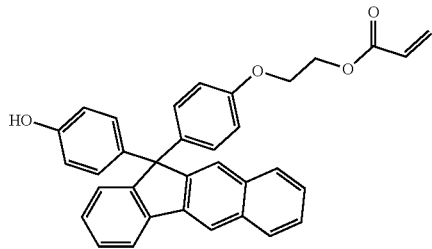

Compound B2

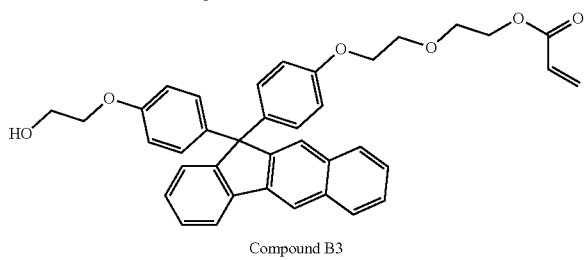

Compound B3

TABLE 1-continued

|  | Monomer composition 1 | Monomer composition 2 | Monomer composition 3 | Monomer composition 4 | Monomer composition 5 | Monomer composition 6 | Monomer composition 7 | Monomer composition 8 | Comparative monomer composition 1 | Comparative monomer composition 2 |
|---|---|---|---|---|---|---|---|---|---|---|

Compound B4

(Preparation of Curable Composition)

Each component was mixed to obtain the composition shown in Table 2, and the mixture was stirred to make it homogeneous to prepare curable compositions of Examples 1 to 13 and Comparative Examples 1 and 2. The prepared curable composition was sealed in a brown glass bottle and stored in a refrigerator at −5° C. The components used to form the curable composition are as follows.

Phenoxyethyl acrylate

BHT (stabilizer)

(manufactured by INOUE PERFUMERY MFG. CO., β-Caryophyllene)

(manufactured by Sigma-Aldrich, (+)-Longifolene)

Irgacure TPO
(manufactured by BASF SE)

PERHEXYL D
(manufactured by NOF CORPORATION)

PERCUMYL H-80
(manufactured by NOF CORPORATION)

JP-513
(manufactured by Johoku Chemical Co., Ltd.)

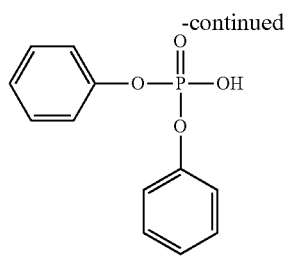

Diphenyl phosphate
(manufactured by
Tokyo Chemical Industry Co., Ltd.)

Various Evaluations
<Mold Releasability>

100 mg of a curable composition, having the diameter of 10 mm and the thickness of 1 mm and sandwiched between transparent glass and a metal plate of which the surface had been treated with chromium nitride, was irradiated with ultraviolet rays of 15 mW/cm$^2$ for 100 seconds using an Execure 3000 (manufactured by Hoya Corporation) to obtain a semi-cured substance. Then, the obtained semi-cured substance was heated at 200° C. for 5 minutes using a hot plate to obtain a thermally cured substance. The obtained thermally cured substance was heated in an oven at 150° C. for 2 hours, and the amount of the cured substance adhering to the metal plate in a case where the glass and the metal plate were separated was obtained and evaluated according to the following criteria.
- 4: The mass of the cured substance adhering to the metal plate was 10 mg or less.
- 3: The mass of the cured substance adhering to the metal plate was more than 10 mg and 20 mg or less.
- 2: The mass of the cured substance adhering to the metal plate was more than 20 mg and 30 mg or less.
- 1: The rate at which the cured substance remained on the metal plate was more than 30 mg.

<Manufacturing of Compound Lens>

200 mg of each of the curable compositions obtained in the examples and the comparative examples was injected into a molding mold (in which the surface brought into contact with the curable composition has an aspherical surface shape) whose surface was treated with chromium nitride, the entire surface of the curable composition that was not in contact with the molding mold was covered with a transparent glass lens (glass material BK-7, convex lens with a diameter of 33 mm, a center thickness of 3 mm, a radius of curvature of the surface in contact with the curable composition=44.3 mm, a radius of curvature of the surface not in contact with the curable composition=330.9 mm), and the curable composition was spread to have a diameter of 30 mm. After this state, irradiation of ultraviolet rays of 300 mJ/cm$^2$ was performed from above the glass lens using an Execure 3000 (manufactured by Hoya Corporation). Next, while maintaining the state sandwiched between the molding mold and the glass lens, the temperature was raised to 200° C. while applying the pressure of 0.196 MPa (2 kgf/cm$^2$) to the curable composition to perform curing (step of forming a cured substance). Subsequently, after cooling the mold temperature to 180° C., the cured substance of the curable composition and the molding mold were separated at the rate of 0.05 mm/sec to produce a compound lens (step of separating a mold). The above-described steps were repeated 100 times for use in the following evaluations, and thereby 100 compound lenses were produced.

Using the curable composition within 15 days after the preparation and the curable composition stored in the refrigerator for 12 months, 100 compound lenses were respectively and similarly produced and used for evaluation.

<External Appearance Test>

The appearance of each of the compound lenses produced as described above was evaluated using a digital microscope (trade name: VHX-1000) manufactured by KEYENCE CORPORATION.

Compound lenses with the surface on which foreign matter defects (bumps) or fine wrinkles were generated were evaluated as defective products, and compound lenses without this generation were evaluated as non-defective products. The produced 100 compound lenses were evaluated, and a proportion of the non-defective products among them was defined as a yield. The evaluation was performed according to the following criteria, and a score of 2 or higher was defined as a pass level.
- 4: The yield was 90% or more.
- 3: The yield was 70% or more and less than 90%.
- 2: The yield was 50% or more and less than 70%.
- 1: The yield was less than 50%.

<Moisture-Heat Resistance Test Evaluation>

Each of the 50 compound lenses prepared using the curable composition within 15 days after preparation was heated to 85° C. and the relative humidity of 85%, and the shape observation of the lenses after a lapse of 100 hours was evaluated using a digital microscope (trade name: VHX-1000) manufactured by KEYENCE CORPORATION. Lenses in which cracks or change in shape was recognized were regarded as defective products, and lenses in which cracks or change in shape was not recognized were regarded as non-defective products. 50 compound lenses were evaluated, and a proportion of the non-defective products among them was defined as a yield. The evaluation was performed according to the following criteria, and a score of 2 or higher was defined as a pass level.
- 4: The yield was 90% or more.
- 3: The yield was 80% or more and less than 90%.
- 2: The yield was 70% or more and less than 80%.
- 1: The yield was less than 70%.

<Heat Shock Test Evaluation>

Each of the 50 compound lenses produced using the curable composition within 15 days after preparation was heated at 60° C. for 48 hours, thereafter, the temperature was returned to room temperature, cooling to −20° C. was further performed, and after a lapse of 48 hours, and the temperature was returned to room temperature. The shape observation of the lenses was evaluated using a digital microscope (trade name: VHX-1000) manufactured by KEYENCE CORPORATION, and lenses in which cracks or change in shape was recognized were regarded as defective products, and lenses in which cracks or change in shape was not recognized were regarded as non-defective products. 50 compound lenses were evaluated, and a proportion of the non-defective products among them was defined as a yield. The evaluation was performed according to the following criteria, and a score of 2 or higher was defined as a pass level.
- 4: The yield was 90% or more.
- 3: The yield was 80% or more and less than 90%.
- 2: The yield was 70% or more and less than 80%.
- 1: The yield was less than 70%.

TABLE 2

| Formulation | | Example 1 | Example 2 | Example 3 | Example 4 | Example 5 | Example 6 | Example 7 |
|---|---|---|---|---|---|---|---|---|
| Monomer composition | Monomer composition 1 | 65.6 | | | | | | |
| | Monomer composition 2 | | 65.6 | | | | | |
| | Monomer composition 3 | | | 65.6 | | | | |
| | Monomer composition 4 | | | | 65.6 | | | |
| | Monomer composition 5 | | | | | 65.6 | | |
| | Monomer composition 6 | | | | | | 65.6 | |
| | Monomer composition 7 | | | | | | | 65.6 |
| | Monomer composition 8 | | | | | | | |
| | Comparative monomer composition 1 | | | | | | | |
| | Comparative monomer composition 2 | | | | | | | |
| (Meth)acrylate monomer | Phenoxyethyl acrylate | 28.1 | 28.1 | 28.1 | 28.1 | 28.1 | 28.1 | 28.1 |
| Stabilizer | BHT | 0.1 | 0.1 | 0.1 | 0.1 | 0.1 | 0.1 | 0.1 |
| Non-conjugated-vinylidene-group-containing compound | β-Caryophyllene (+)-Longifolene | 4.6 | 4.6 | 4.6 | 4.6 | 4.6 | 4.6 | 4.6 |
| Photoradical polymerization initiator | Irgacure TPO | 0.1 | 0.1 | 0.1 | 0.1 | 0.1 | 0.1 | 0.1 |
| Thermal radical polymerization initiator | PERHEXYL D | 0.4 | 0.4 | 0.4 | 0.4 | 0.4 | 0.4 | 0.4 |
| | PERCUMYL H-80 | 0.7 | 0.7 | 0.7 | 0.7 | 0.7 | 0.7 | 0.7 |
| Mold release agent | JP-513 Diphenyl phosphate | 0.4 | 0.4 | 0.4 | 0.4 | 0.4 | 0.4 | 0.4 |
| Total | | 100 | 100 | 100 | 100 | 100 | 100 | 100 |
| Evaluation | | | | | | | | |
| Mold releasability | | 4 | 4 | 4 | 4 | 4 | 4 | 4 |
| External appearance of compound lens | Within 15 days after preparing resin | 4 | 4 | 4 | 4 | 4 | 4 | 4 |
| | After 12 months of storing in refrigerator | 2 | 4 | 4 | 4 | 4 | 4 | 4 |
| Moisture-heat resistance test of compound lens | | 4 | 4 | 4 | 4 | 2 | 4 | 3 |
| Heat shock test of compound lens | | 2 | 3 | 4 | 4 | 4 | 4 | 4 |

| Formulation | | Example 8 | Example 9 | Example 10 | Example 11 | Example 12 | Example 13 | Comparative Example 1 | Comparative Example 2 |
|---|---|---|---|---|---|---|---|---|---|
| Monomer composition | Monomer composition 1 | | 69.9 | 66.3 | 65.9 | 65.6 | 65.6 | | |
| | Monomer composition 2 | | | | | | | | |
| | Monomer composition 3 | | | | | | | | |
| | Monomer composition 4 | | | | | | | | |
| | Monomer composition 5 | | | | | | | | |
| | Monomer composition 6 | | | | | | | | |
| | Monomer composition 7 | | | | | | | | |
| | Monomer composition 8 | 65.6 | | | | | | | |
| | Comparative monomer composition 1 | | | | | | | 65.6 | |
| | Comparative monomer composition 2 | | | | | | | | 65.6 |
| (Meth)acrylate monomer | Phenoxyethyl acrylate | 28.1 | 29.5 | 28.5 | 28.2 | 28.1 | 28.1 | 28.1 | 28.1 |
| Stabilizer | BHT | 0.1 | 0.1 | 0.1 | 0.1 | 0.1 | 0.1 | 0.1 | 0.1 |
| Non-conjugated- | β-Caryophyllene | 4.6 | | 4.6 | 4.6 | 4.6 | | 4.6 | 4.6 |

TABLE 2-continued

| Formulation | | Example 1 | Example 2 | Example 3 | Example 4 | Example 5 | Example 6 | Example 7 |
|---|---|---|---|---|---|---|---|---|
| vinylidene-group-containing compound | (+)-Longifolene | | | | | | 4.6 | |
| Photoradical polymerization initiator | Irgacure TPO | 0.1 | 0.1 | 0.1 | 0.1 | 0.1 | 0.1 | 0.1 | 0.1 |
| Thermal radical polymerization initiator | PERHEXYL D | 0.4 | 0.4 | 0.4 | 0.4 | 0.4 | 0.4 | 0.4 | 0.4 |
| | PERCUMYL H-80 | 0.7 | | | 0.7 | 0.7 | 0.7 | 0.7 | 0.7 |
| Mold release agent | JP-513 | 0.4 | | | | | 0.4 | 0.4 | 0.4 |
| | Diphenyl phosphate | | | | | 0.4 | | | |
| Total | | 100 | 100 | 100 | 100 | 100 | 100 | 100 | 100 |
| Evaluation | | | | | | | | | |
| Mold releasability | | 4 | 2 | 2 | 2 | 3 | 4 | 4 | 4 |
| External appearance of compound lens | Within 15 days after adjusting resin | 4 | 2 | 3 | 4 | 4 | 3 | 4 | 4 |
| | After 12 months of storing in refrigerator | 4 | 2 | 3 | 4 | 4 | 3 | 1 | 4 |
| Moisture-heat resistance test of compound lens | | 4 | 4 | 4 | 4 | 4 | 4 | 4 | 1 |
| Heat shock test of compound lens | | 4 | 3 | 3 | 3 | 3 | 3 | 1 | 4 |

What is claimed is:

1. A curable composition comprising:
   a compound represented by General Formula A;
   a compound represented by General Formula B; and
   a polymerization initiator,
   wherein a ratio of a substance amount of the compound represented by General Formula B to a substance amount of the compound represented by General Formula A is 1 to 25 mol %, General Formula A

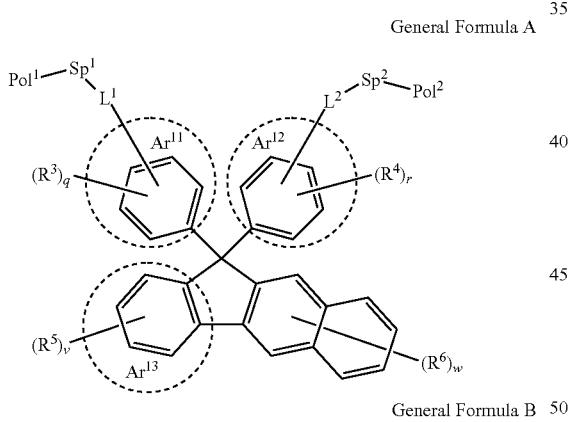

General Formula B

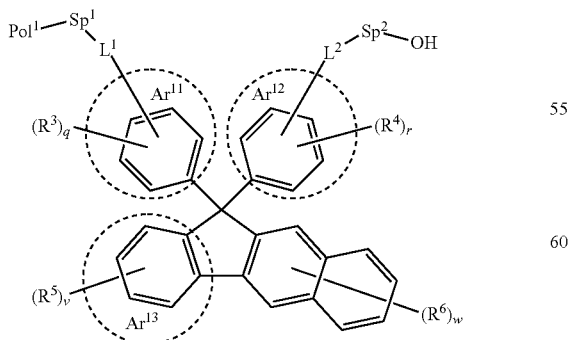

in General Formula A and General Formula B, $Ar^{11}$ and $Ar^{12}$ each independently represent an aryl group containing a benzene ring surrounded by a broken line or a heteroaryl group containing a benzene ring surrounded by a broken line as one of rings constituting a fused ring, $Ar^{13}$ represents an arylene group containing a benzene ring surrounded by a broken line, $L^1$ and $L^2$ each independently represent a single bond, or a linking group selected from the group consisting of —O—, —S—, —C(=O)—, —OC(=O)—, —C(=O)O—, —OC(=O)O—, —SC(=O)—, and —C(=O)S—, $Sp^1$ and $Sp^2$ each independently represent a single bond or a divalent linking group, $Pol^1$ and $Pol^2$ each independently represent a polymerizable group, $R^3$ to $R^6$ each independently represent a substituent, and q, r, v, and w are each independently an integer of 0 to 4.

2. The curable composition according to claim 1, wherein $Pol^1$ and $Pol^2$ are each a (meth)acryloyloxy group in General Formula A and General Formula B.

3. The curable composition according to claim 1, wherein a ratio of a substance amount of the compound represented by General Formula B to a substance amount of the compound represented by General Formula A is 2 to 20 mol %.

4. The curable composition according to claim 1, further comprising a non-conjugated-vinylidene-group-containing compound.

5. The curable composition according to claim 4,
   wherein the non-conjugated-vinylidene-group-containing compound is a compound represented by General Formula (2), General Formula (2)

in the formula, $R^{21}$ to $R^{26}$ each independently represent a hydrogen atom or a substituent, and at least two of $R^{21}$ to $R^{26}$ form a ring, where the compound represented by General Formula (2) does not contain a polymerizable group.

6. The curable composition according to claim 4, wherein the non-conjugated-vinylidene-group-containing compound further has a double bond in addition to a non-conjugated vinylidene group.

7. The curable composition according to claim 4, further comprising a hydroperoxide.

8. The curable composition according to claim 5, further comprising a hydroperoxide.

9. The curable composition according to claim 6, further comprising a hydroperoxide.

10. The curable composition according to claim 1, further comprising an acidic phosphoric acid ester.

11. The curable composition according to claim 4, further comprising an acidic phosphoric acid ester.

12. The curable composition according to claim 7, further comprising an acidic phosphoric acid ester.

13. The curable composition according to claim 8, further comprising an acidic phosphoric acid ester.

14. The curable composition according to claim 9, further comprising an acidic phosphoric acid ester.

15. The curable composition according to claim 10, wherein the acidic phosphoric acid ester is a compound represented by General Formula X,

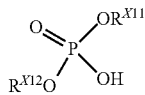

General Formula X in General Formula X, $R^{X11}$ represents an alkyl group which may have a substituent, and $R^{X12}$ represents a hydrogen atom or an alkyl group which may have a substituent.

16. The curable composition according to claim 11, wherein the acidic phosphoric acid ester is a compound represented by General Formula X,

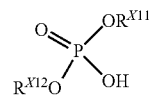

General Formula X in General Formula X, $R^{X11}$ represents an alkyl group which may have a substituent, and $R^{X12}$ represents a hydrogen atom or an alkyl group which may have a substituent.

17. The curable composition according to claim 12, wherein the acidic phosphoric acid ester is a compound represented by General Formula X,

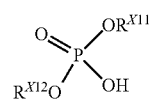

General Formula X in General Formula X, $R^{X11}$ represents an alkyl group which may have a substituent, and $R^{X12}$ represents a hydrogen atom or an alkyl group which may have a substituent.

18. A cured substance of the curable composition according to claim 1.

19. An optical member comprising the cured substance according to claim 18.

20. A lens comprising the cured substance according to claim 18.

* * * * *